US012739433B2

(12) United States Patent
Huang et al.

(10) Patent No.: US 12,739,433 B2
(45) Date of Patent: Sep. 15, 2026

(54) POINT CLOUD ATTRIBUTE COMPRESSION WITH POINT CLOUD GEOMETRY DECOUPLING

(71) Applicant: InterDigital VC Holdings, Inc., Wilmington, DE (US)

(72) Inventors: Yuning Huang, West Lafayette, IN (US); Jiahao Pang, Plainsboro, NJ (US); Muhammad Asad Lodhi, Highland Park, NJ (US); Junghyun Ahn, New York, NY (US); Dong Tian, Boxborough, MA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/829,967

(22) Filed: Sep. 10, 2024

(65) Prior Publication Data

US 2026/0075245 A1 Mar. 12, 2026

(51) Int. Cl.
*H04N 19/597* (2014.01)
*H04N 19/136* (2014.01)
*H04N 19/169* (2014.01)
*H04N 19/96* (2014.01)

(52) U.S. Cl.
CPC ......... *H04N 19/597* (2014.11); *H04N 19/136* (2014.11); *H04N 19/169* (2014.11); *H04N 19/96* (2014.11)

(58) Field of Classification Search
CPC .. H04N 19/597; H04N 19/136; H04N 19/169; H04N 19/96
See application file for complete search history.

(56) References Cited

U.S. PATENT DOCUMENTS

| | | | | |
|---|---|---|---|---|
| 11,030,460 | B1 * | 6/2021 | Yoon | G06V 40/10 |
| 12,169,900 | B2 * | 12/2024 | Khakhulin | G06N 3/096 |
| 12,444,089 | B2 * | 10/2025 | Hur | G06T 9/001 |
| 2018/0268570 | A1 * | 9/2018 | Budagavi | G06T 9/001 |
| 2019/0304105 | A1 * | 10/2019 | Gao | G06V 10/255 |
| 2020/0074729 | A1 * | 3/2020 | Yan | G01S 7/4802 |
| 2020/0219288 | A1 * | 7/2020 | Joshi | G06T 9/001 |

(Continued)

FOREIGN PATENT DOCUMENTS

CN 117915114 A 4/2024

OTHER PUBLICATIONS

Qi et al., "Pointnet: Deep learning on point sets for 3d classification and segmentation", Proceedings of the IEEE conference on computer vision and pattern recognition. 2017, 9 pages.

(Continued)

*Primary Examiner* — Peter D Le
(74) *Attorney, Agent, or Firm* — Klintworth & Rozenblat LLP

(57) ABSTRACT

In one implementation, a method for reconstructing attributes of a point cloud is provided wherein a geometry feature map representative of a geometry of the point cloud is obtained, an attribute feature map is decoded from a bitstream, the attribute feature map being representative of attributes of points of the point cloud, and the decoded attribute feature map is updated with the geometry feature map. Attributes of points of the point cloud are reconstructed based on the updated decoded attribute feature map.

20 Claims, 27 Drawing Sheets

(56) References Cited

U.S. PATENT DOCUMENTS

| | | | | |
|---|---|---|---|---|
| 2020/0286261 | A1* | 9/2020 | Faramarzi | G06T 9/001 |
| 2021/0150199 | A1* | 5/2021 | Mao | G06T 7/246 |
| 2021/0152831 | A1* | 5/2021 | Liu | H04N 19/91 |
| 2021/0168386 | A1* | 6/2021 | Zhang | H04N 19/96 |
| 2021/0192796 | A1* | 6/2021 | Aflaki Beni | G06T 9/40 |
| 2021/0304444 | A1* | 9/2021 | Zhang | H04N 19/88 |
| 2021/0409767 | A1* | 12/2021 | Oh | H04N 21/85406 |
| 2022/0005232 | A1* | 1/2022 | Harviainen | G06T 9/002 |
| 2022/0239946 | A1* | 7/2022 | Park | H04N 19/60 |
| 2022/0353492 | A1* | 11/2022 | Yano | G06T 17/00 |
| 2023/0005189 | A1* | 1/2023 | Lin | G06T 9/001 |
| 2023/0215055 | A1* | 7/2023 | Dai | G06T 9/005 382/232 |
| 2023/0377208 | A1* | 11/2023 | Akhtar | G06T 3/40 |
| 2024/0221305 | A1* | 7/2024 | Xu | G06T 9/001 |
| 2024/0380926 | A1* | 11/2024 | Ikai | H04N 19/42 |
| 2025/0014228 | A1* | 1/2025 | Quach | G06T 9/001 |

OTHER PUBLICATIONS

International Search Report and Written Opinion of the International Searching Authority for PCT/US2025/044610 mailed Jan. 7, 2026 (16 pages).

Wang, J. et al., "[AI-3DGC] Lossless SparsePCAC: Multiscale Sparse Representation for Lossless Point Cloud Attribute Compression" International Organisation for Standardisation Organisation Internationale de Normalisation ISO/IEC JTC 1/SC 29/WG 7 Coding of Moving Pictures and Audio, ISO/IEC JTC 1/SC 29/WG 7 m61007, Online, Oct. 2022 (7 pages).

Fang, G. et al., "3DAC: Learning attribute compression for point clouds." In Proceedings of the IEEE/CVF Conference on Computer Vision and Pattern Recognition, pp. 14799-14808. 2022 (10 pages).

Lodhi , M. A. et al., "[AI-3DGC] Point Cloud Geometry Compression Using Learned Octree Entropy Coding", ISO/IEC JTC 1/SC 29/WG 7 m58167, Oct. 2021 (7 pages).

Zhang, J. et al., "G-PCC++: Enhanced geometry-based point cloud compression." In Proceedings of the 31st ACM International Conference on Multimedia, pp. 1352-1363. 2023 (12 pages).

Pang, J. et al., "[AI-GC] [CfP-response] UniFHiD Part 3: InterDigital's answer to MPEG AI-PCC for Track 2 Geometry +Attribute" International Organisation for Standardisation Organisation Internationale de Normalisation ISO/IEC JTC 1/SC 29/WG 7 Coding of Moving Pictures and Audio, ISO/IEC JTC 1/SC 29/WG 7 m70285, Kemer, Nov. 2024 (20 pages).

Nguyen, D. T. et al., "Deep probabilistic model for lossless scalable point cloud attribute compression." In ICASSP 2023-2023 IEEE International Conference on Acoustics, Speech and Signal Processing (ICASSP), pp. 1-5. IEEE, 2023 (5 pages).

* cited by examiner

Feature
CE
C
FE
$\sigma$
CFE
Feature bitstream

FIG. 15

FD
$\sigma$
CD
C
CFD
Feature

FIG. 16

POINT CLOUD ATTRIBUTE COMPRESSION WITH POINT CLOUD GEOMETRY DECOUPLING

INCORPORATION BY REFERENCE

The present application incorporates by reference in their entirety the following applications: U.S. patent application Ser. No. 18/679,144, entitled "An End-To-End Learning-Based Point Cloud Coding Framework" ("144 application"), U.S. patent application Ser. No. 18/654,987, entitled "Rate Control for Point Cloud Coding with a Hyperprior Model" ("987 application"), and U.S. patent application Ser. No. 18/814,402, entitled "An End-To-End Learning-Based Point Cloud Attribute Coding Framework" ("402 application").

BACKGROUND

The present application is related to dynamic point cloud compression and processing.

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever and is expected to be an ultimate enabler in the applications discussed herein.

BRIEF SUMMARY

Briefly stated, in one embodiment, a method for reconstructing attributes of a point cloud is provided, comprising: obtaining a geometry feature map representative of a geometry of the point cloud, decoding an attribute feature map from a bitstream, the attribute feature map being representative of attributes of points of the point cloud, updating the decoded attribute feature map with the geometry feature map, and reconstructing attributes of points of the point cloud based on the updated decoded attribute feature map.

According to another embodiment, an apparatus for reconstructing attributes of a point cloud is provided, comprising one or more processors and at least one memory coupled to the one or more processors, wherein the one or more processors are configured to: obtain a geometry feature map representative of a geometry of the point cloud, decode an attribute feature map from a bitstream, the attribute feature map being representative of attributes of points of the point cloud, update the decoded attribute feature map with the geometry feature map, and reconstruct attributes of points of the point cloud based on the updated decoded attribute feature map.

According to another embodiment, a method for encoding attributes of a point cloud is provided, comprising: obtaining a geometry feature map representative of a geometry of the point cloud, obtaining an attribute feature map from a bitstream, the attribute feature map being representative of attributes of points of the point cloud, refining the attribute feature map with the geometry feature map, encoding the refined attribute feature map.

According to another embodiment, an apparatus is provided that comprises one or more processors, coupled to a memory, configured to obtain a geometry feature map representative of a geometry of the point cloud, obtain an attribute feature map from a bitstream, the attribute feature map being representative of attributes of points of the point cloud, refine the attribute feature map with the geometry feature map, encode the refined attribute feature map.

According to another embodiment, a method for processing an attribute feature map of a point cloud is provided, comprising obtaining a geometry feature map from the point cloud and processing the attribute feature map with the geometry feature map using a conditional encoder.

According to another embodiment, a method for reconstructing an attribute feature map of a point cloud is provided, comprising obtaining a geometry feature map from the point cloud, obtaining a decoded attribute feature map, and processing the decoded attribute feature map with the geometry feature map using a conditional decoder.

In another embodiment, an apparatus is provided that comprises one or more processors operable to perform any one of the methods mentioned herein.

One or more embodiments also provide a computer program comprising instructions which when executed by one or more processors cause the one or more processors to perform any of the methods mentioned above. One or more of the present embodiments also provide a non-transitory computer readable medium and/or a computer readable storage medium having stored thereon instructions for performing any of the methods mentioned above.

One or more embodiments also provide a computer readable storage medium having stored thereon a bitstream generated according to the methods described herein. One or more embodiments also provide a method and apparatus for transmitting or receiving the bitstream generated according to the methods described above.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings:

FIG. 15 illustrates a feature encoder using conditional encoding, according to an embodiment;

FIG. 16 illustrates a feature decoder using conditional decoding, according to an embodiment;

DETAILED DESCRIPTION

Figure 1:
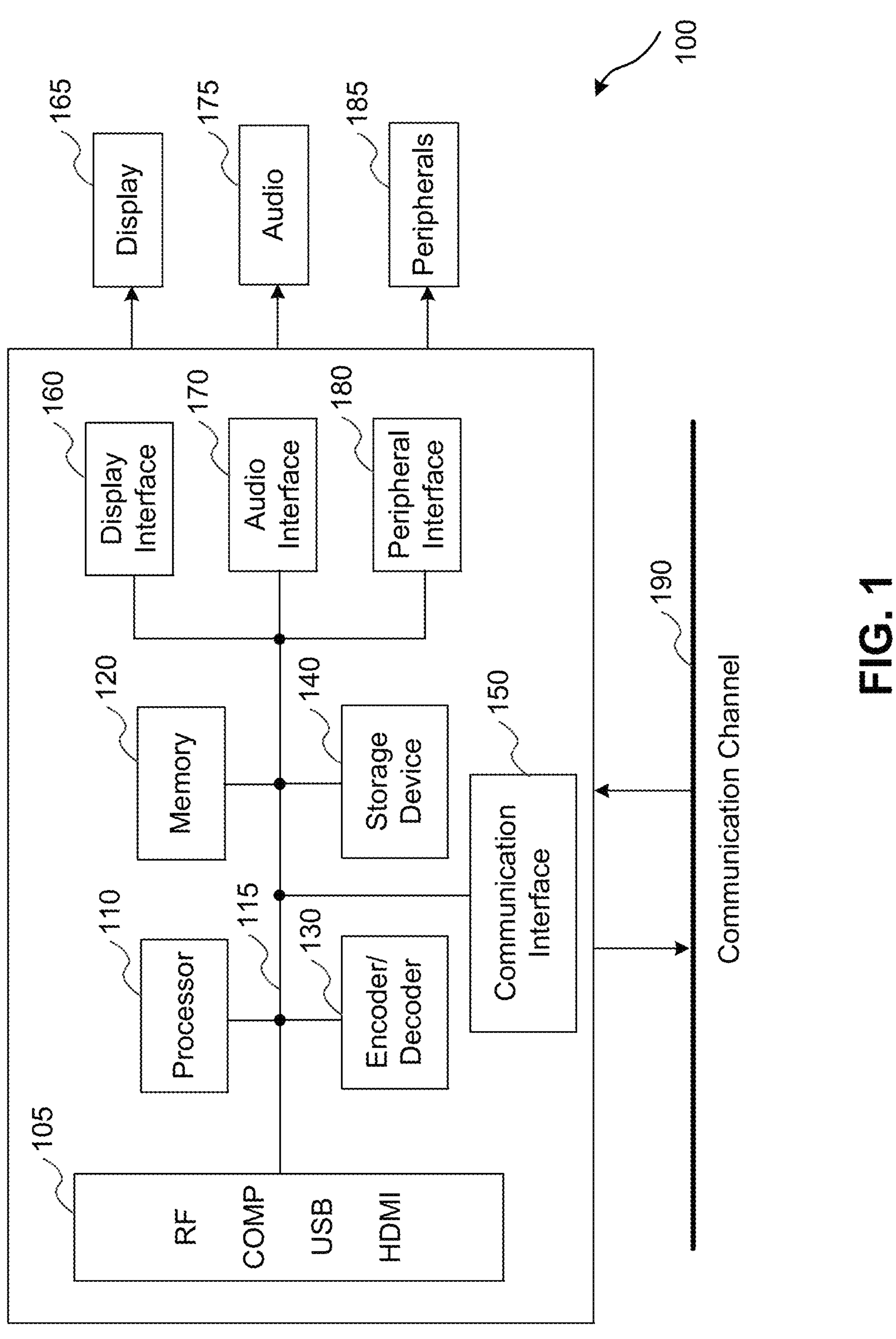
FIG. 1 illustrates a block diagram of a system within which aspects of the present embodiments may be implemented.

In describing the various embodiments of the present disclosure, certain terminology is used herein for convenience only and should not be considered as limiting such embodiments. In the drawings, the same reference numerals are employed for designating the same elements throughout the several figures and the present description.

Referring to the drawings, there is shown in FIG. 1 a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105.

Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications.

The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Point Cloud Data Format

Point cloud data is believed to consume a large portion of network traffic, e.g., among connected cars over 5G network, and immersive communications (VR/AR). Efficient representation formats are necessary for point cloud understanding and communication. In particular, raw point cloud data needs to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

Each point of the point clouds is represented at least by a 3D position (x, y, z). The set of the 3D positions illustrates the geometry of the object/scene that the point cloud is captured from. Additionally, each point of the point cloud can be associated with some attributes, depending on the applications. For example, for VR/AR/Gaming, the attribute includes color (r, g, b); and for LiDAR, the attribute includes reflectance.

Point Cloud Data Use Cases

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds have become a hot topic and foreseen by many as the future of 2D flat video. The basic idea is to immerse the viewer in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. They may be static or dynamic and are typically of average size, for example, no more than millions of points at a time.

Point clouds may also be used for various purposes such as culture heritage/buildings in which objects like statues or buildings are scanned in 3D to share the spatial configuration of the object without sending or visiting it. Also, it is a way to ensure preserving the knowledge of the object in case it may be destroyed, for instance, a temple by an earthquake. Such point clouds are typically static, colored, and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored, and huge.

World modeling and sensing via point clouds could be an essential technology to allow machines to gain knowledge about the 3D world around them, which is crucial for the applications discussed above.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

The first step for any processing or inference on the point cloud is to have efficient storage methodologies. To store and process the input point cloud with affordable computational cost, one solution is to down-sample it first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down sampled) into a bitstream through entropy coding techniques for lossless compression.

In addition to lossless coding, many scenarios seek lossy coding for a significantly improved compression ratio while maintaining the induced distortion under certain quality levels. To achieve a less lossy coding, an efficient point feature extractor is necessary to improve the accuracy of the reconstruction within the given resource budget.

Learning-Based Point Cloud Compression

Since point cloud data is composed of two components: geometry information and attribute information, the compression of point clouds can be classified into two categories: geometry coding and attribute coding. This work is focused on attribute coding and assumes that the geometry information of the point cloud is already coded and available at both encoder and decoder.

Examples of existing learning-based point cloud attribute compression techniques include deep octree-based attribute compression and end-to-end feature-based attribute coding. With deep octree-based attribute compression, neural network-based models are utilized to estimate the discrete probability distribution of the attribute values. Such estimated probabilities are then used to help the arithmetic coder to encode or decode the attribute value(s) associated with that particular point.

A challenge of learning-based point cloud compression is to effectively extract point cloud attribute features, so that it makes the extracted point cloud attribute features more representative and more helpful for point cloud attribute compression. With more representative point cloud attribute features, compression of the point cloud attributes becomes more efficient. In the traditional way of point cloud attribute extraction, the point cloud attribute attached on top of the point cloud geometry is directly fed to a neural network module for extraction, which may lead to features that contain both geometry information as well as attribute information. Therefore, the extracted features are less representative for attribute coding.

In the following, a method for point cloud attribute compression is provided using learning-based method which improves attribute encoding of previous methods is described in relation with FIG. 30-33. This design can be used in any learning-based point cloud attribute compression frameworks. FIG. 2-26 described below presents some examples of such learning-based attribute compression framework in which the provided method could be used.

Since the frameworks/methods described herein relate to point attribute compression, it is assumed in the following that point cloud geometry is known and available both at the encoder and the decoder. On the decoder side, the geometry is a decoded version of the geometry encoded at the encoder. In case of lossless compression of the geometry, the decoded geometry is the same as the geometry of the input point cloud. When lossy geometry is used, the encoder side also uses the decoded geometry version available at the decoder.

One challenge when using a learning-based method for octree-based attribute coding is to effectively estimate the attribute probability distribution. With higher accuracy of the estimated distribution, the arithmetic coding of the attribute of an octree voxel would use fewer bits. In traditional learning-based methods for octree-based attribute methods, neural network models are typically provided with an input based on the attributes at the parent octree level or the derived features from parent octree level. They may additionally use the attribute information and derived features from sibling octree voxels that are already encoded or decoded. Because there is no access to finer octree level information, such approaches may suffer from less accurate probability estimation and non-necessary high complexity may be also involved. These learning-based methods for octree-based attribute coding which depend solely on octree voxel attribute information from parent levels, or from sibling nodes at current level constitute a top-down strategy.

In the following, a method for coding the octree-based attribute information for a point cloud is described which uses a bottom-up strategy according to which the attribute probability distribution is estimated using finer level of details. According to this method, on the encoder side, before encoding attribute information into bitstream, attribute features are first encoded into bitstream that are extracted/aggregated based on the attribute information from the finer levels of the octree. Such features are used to assist the encoder to perform the arithmetic coding of the attribute information. On the decoder side, the decoder first decodes the feature, and then decodes the attribute information based on the decoded feature.

This point cloud attribute coding technique utilizes features from the finer level of details to unify lossless and lossy point cloud attribute coding in a hierarchical manner. Such a point cloud attribute coding method is extended to the coding of dynamic point cloud attribute (attributes of a sequence of point clouds).

In the following, the intra point cloud attribute coding is first described, then its extension to dynamic point cloud attribute coding is described.

Octree-Based Attribute Encoding

Figure 2:
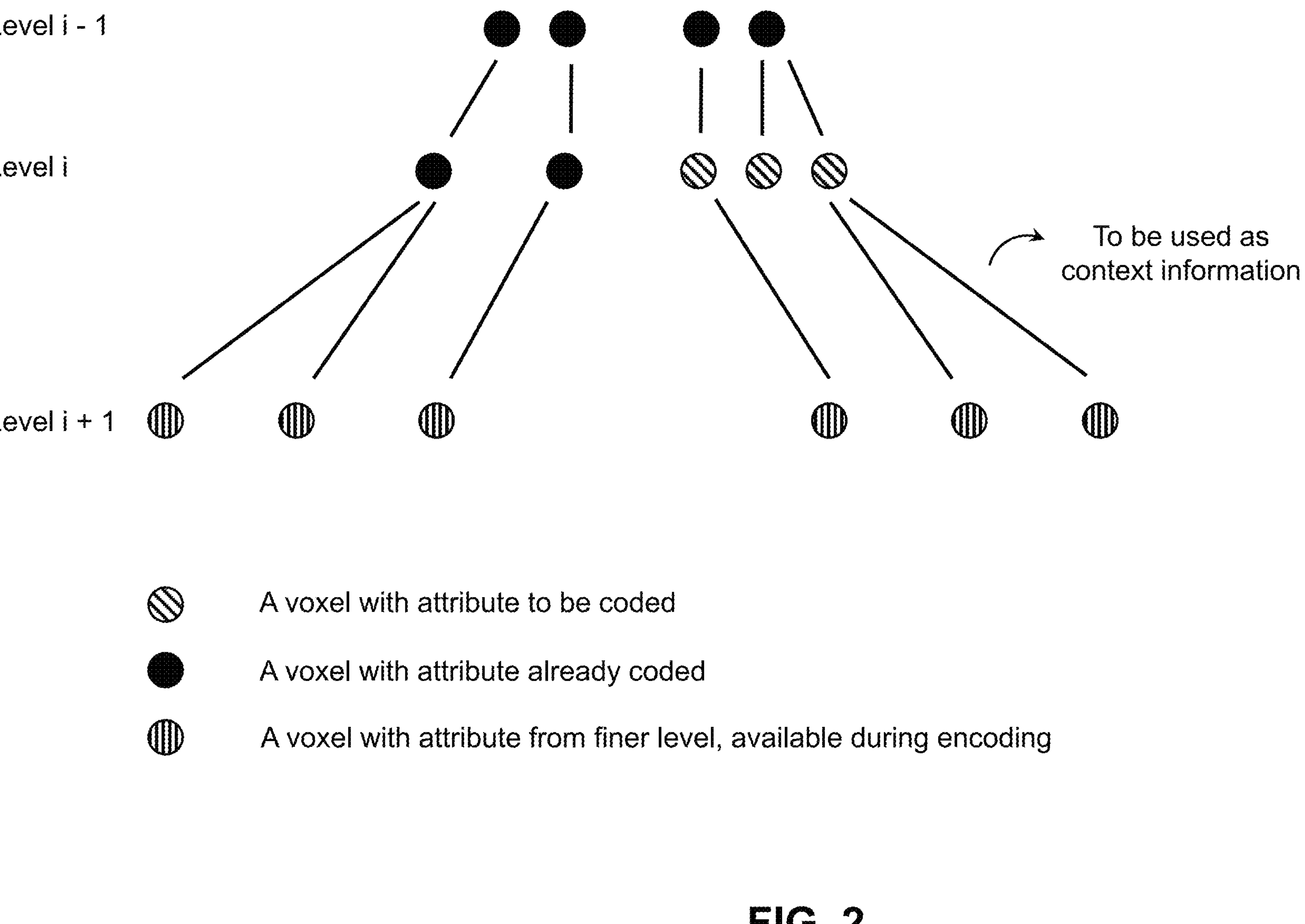
FIG. 2 illustrates voxels in different levels.
Figures 3, 4:
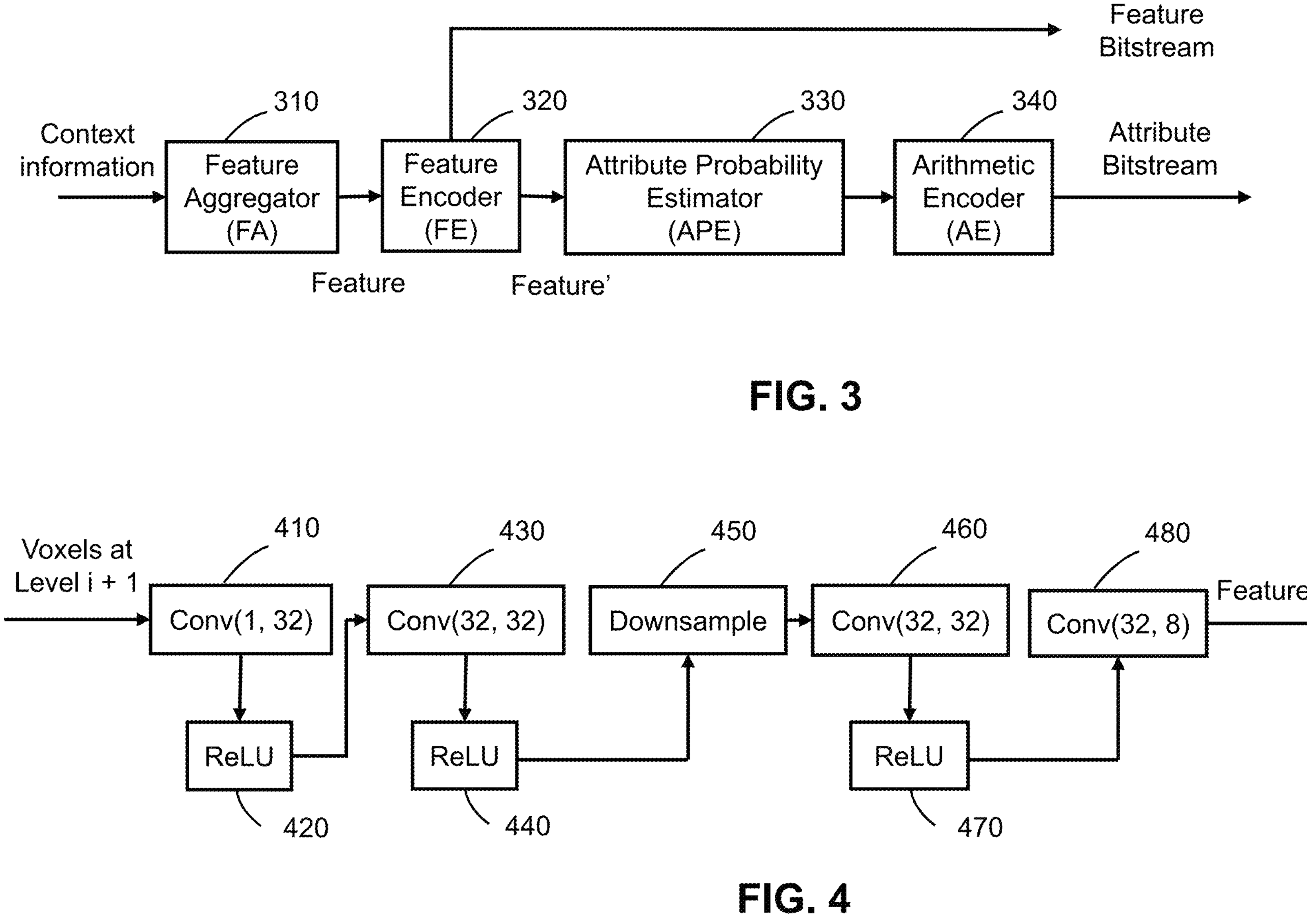
FIG. 3 illustrates octree-based attribute encoding using a learning-based method.
FIG. 4 illustrates a feature aggregator (FA) with only one level as input.

FIG. 2 illustrates an example of a portion (level i−1, i, i+1) of an octree to be coded. FIG. 3 illustrates the attribute encoding method. Unlike the feature extractor in prior-art method where the input is from its parent level and may be from the current level in addition, the proposed feature extractor/aggregator (310) uses the finer (child) level of details as its input. Because the finer level of voxels always has more detailed information comparing to voxels from a parent level, it is much easier to extract more representative features.

The generated features are encoded (320) into bitstreams. In addition to generating the bitstream, the feature encoder also outputs the reconstructed feature (Feature'), that may not be exactly the same as the feature (Feature) from the feature extractor/aggregator (310). In a variant, the reconstructed feature is a quantized version of the feature from the feature extractor/aggregator (310). In one embodiment, a dequantization is further performed as the output of Feature Encoder. The reconstructed feature should match the decoded feature on a decoder.

The attribute probability estimator (APE, 330) uses a neural network model. It takes the reconstructed feature as its input and computes the attribute probability distribution of a current octree voxel.

Based on the estimated probability, the arithmetic encoder (340) encodes the attribute information of the current octree voxels into a bitstream.

In FIG. 3, feature bitstream and attribute bitstream are generated separately. In other implementations, one single bitstream can be generated to include both the feature and attribute information.

In the present document, the term feature relates to the data extracted from context information, such as attribute values of voxels in the point cloud (being obtained by considering either voxels in parent levels nodes, siblings voxels or voxels not yet encoded) using for example CNN or Feature extractor/aggregator described herein. The wordings feature, features and feature map can be used interchangeably to refer to this extracted data.

Feature Aggregator

In one embodiment, the feature aggregator (FA) (310) is shown in FIG. 4. In this embodiment, the feature extractor just takes the immediate next level of voxel with attributes as input to extract features. No feature is propagated from earlier levels.

In this design of the feature aggregator (FA) (310), it is composed of several 3D convolutional layers (with downsample), i.e., the "Conv" blocks (410, 430, 460, 480), where Conv(x, y) means the input feature channel size is x while the output feature channel size is y. All the convolutional layers, except for the last one, are appended by a ReLU activation function (420, 440, 470) to introduce non-linearity to the feature aggregation process. The "Downsample" block (450) is to downsample the feature from (i+1)-th to the i-th level. In more advanced embodiments, the convolutional layers can be replaced with other commonly used feature aggregation blocks, such as an Inception ResNet (IRN) block, and a Voxel Transformer block, and these blocks can be repeated several times to enhance the feature aggregation performance.

The input to the FA module can be the voxelized point cloud with attribute information associated with it, for RGB color attribute, the input channel size can be 3; while for reflectance in LiDAR point cloud, the input channel size can be 1.

Figures 5, 6:
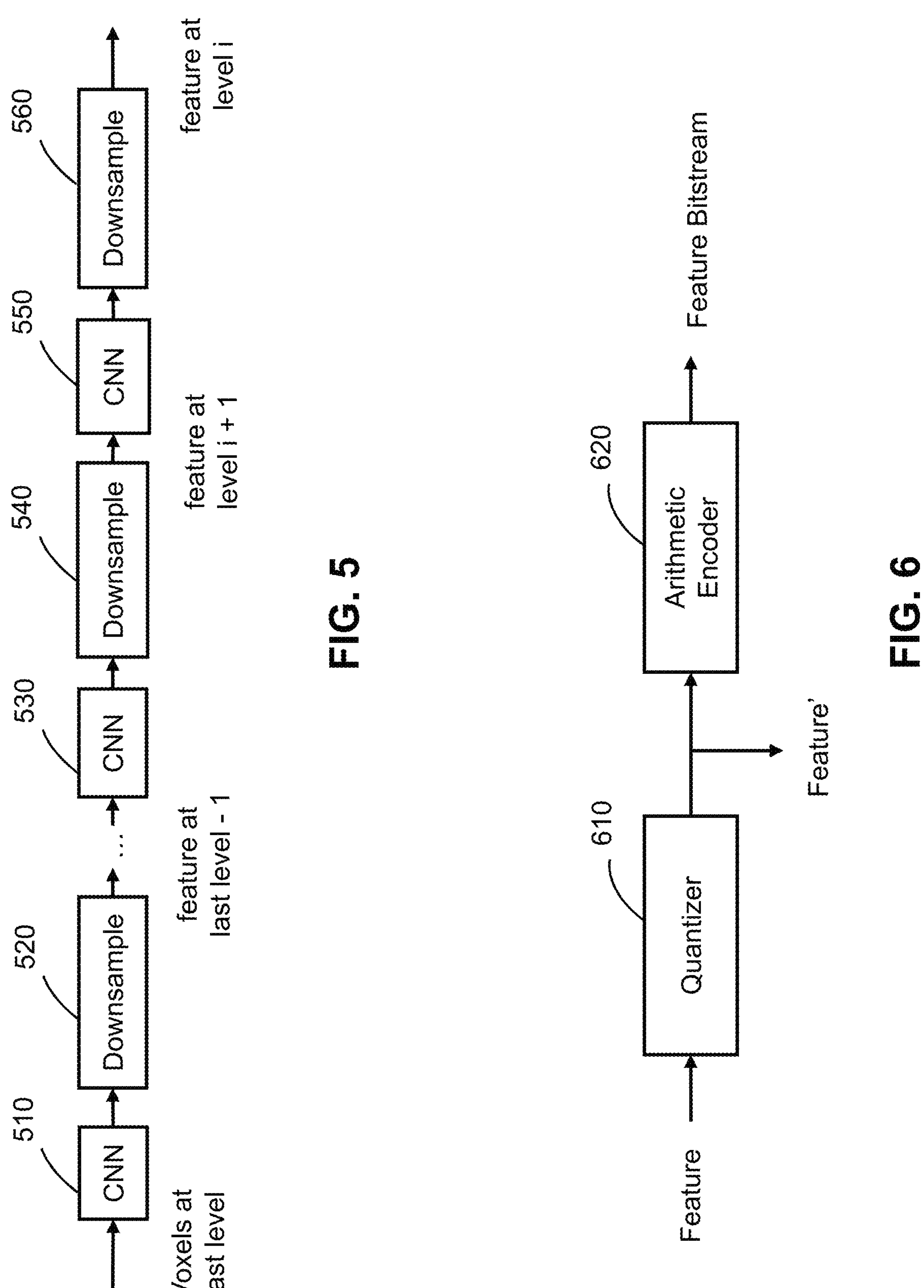
FIG. 5 illustrates a feature aggregator (FA) with aggregated feature as input.
FIG. 6 illustrates a feature encoder using uniform quantization.

In another embodiment, the feature aggregator (FA) (310) is shown in FIG. 5. The feature extraction and aggregation start from the finest level of octree. Comparing to FIG. 4, the aggregated feature can be more powerful, as it undergoes a deeper network to aggregate the feature all the way from the finest level to the current level.

Specifically, in this design of the feature aggregator (FA) (310), it consists of several 3D convolutional neural network (CNN) blocks (510, 530, 550) followed by downsampling (520, 540, 560). The CNN module is simply composed of a series of back-to-back 3D convolutional layers. The "Downsample" blocks are to gradually downsample the feature from the last (finer) level to the i-th level. In more advanced embodiments, the CNN blocks can be replaced with other commonly used feature aggregation blocks, such as an Inception ResNet (IRN) block, or a Voxel Transformer block, and these blocks can be repeated several times to enhance the feature aggregation performance.

Feature Encoder Using Uniform Quantization

The feature encoder (320) can be implemented in various ways. In one embodiment, a proposed feature encoder is shown in FIG. 6. The feature is quantized (610) based on a quantization step. The selection of quantization step is out of the scope of this work, but in a nutshell, it is a pre-selected parameter based on rate distortion requirement. The quantized feature is arithmetically encoded (620) into a feature bitstream. This proposed feature encoder is simple, and less complex comparing to the feature encoder described below.

Feature Encoder Using Hyperprior Encoding

Figure 7:
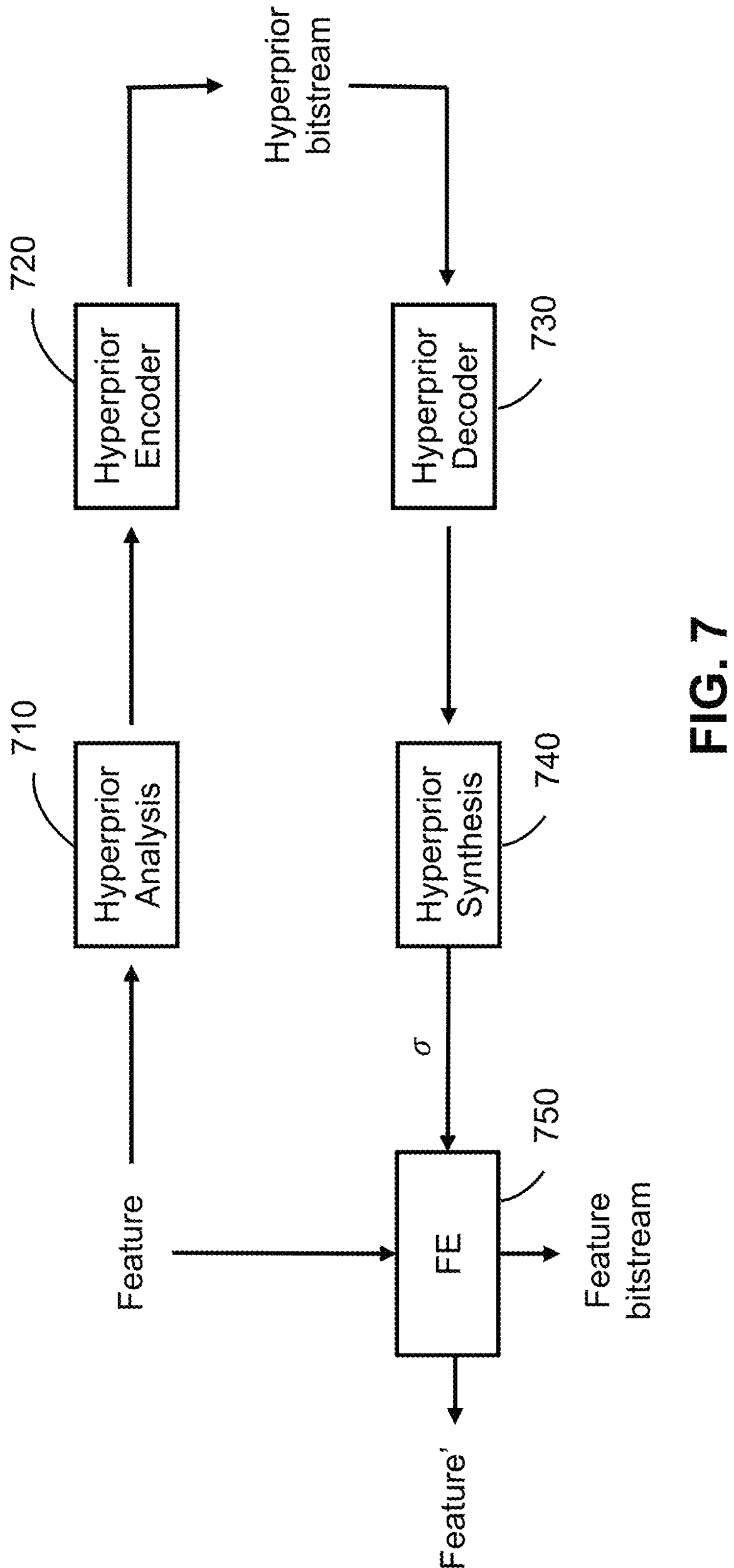
FIG. 7 illustrates a feature encoder using hyperprior encoder.

In this embodiment, another feature encoder (320) is proposed as shown in FIG. 7 which employs an hyperprior encoder. The purpose of this design is to analyze and utilize the distribution of the feature so as to perform efficient arithmetic coding of the feature.

The initial feature is sent to a "hyperprior analysis" module (710) to aggregate a hyperprior feature that is more abstract than the input feature. The hyperprior feature needs much less bit rate to be encoded. It is used to compute the hyperprior parameters later. The hyperprior feature is encoded (720) into a hyperprior bitstream, that may undergo some quantization first and then arithmetic encoding.

The hyperprior bitstream is arithmetically decoded (730) to output a reconstructed hyperprior feature. In one embodiment, the reconstructed feature is dequantized further before being outputted. The reconstructed hyperprior feature is sent to a "hyperprior synthesis" module (740) to compute the distribution parameters of the initial feature. In the embodiment shown in FIG. 7, the distribution parameters include variance parameters of the initial feature. In another embodiment, the distribution parameters include both the mean and the variance parameters of the initial feature.

The estimated hyperprior parameters (mean and variance) are provided to an arithmetic encoder (FE, 750) to encode the initial feature. The hyperprior encoder is more advanced than the feature encoder illustrated in FIG. 6. It can provide higher coding performance. The "hyperprior analysis" (710) and "hyperprior synthesis" modules (740) are typically learnable neural network modules.

Attribute Probability Estimator

Figures 8, 9:
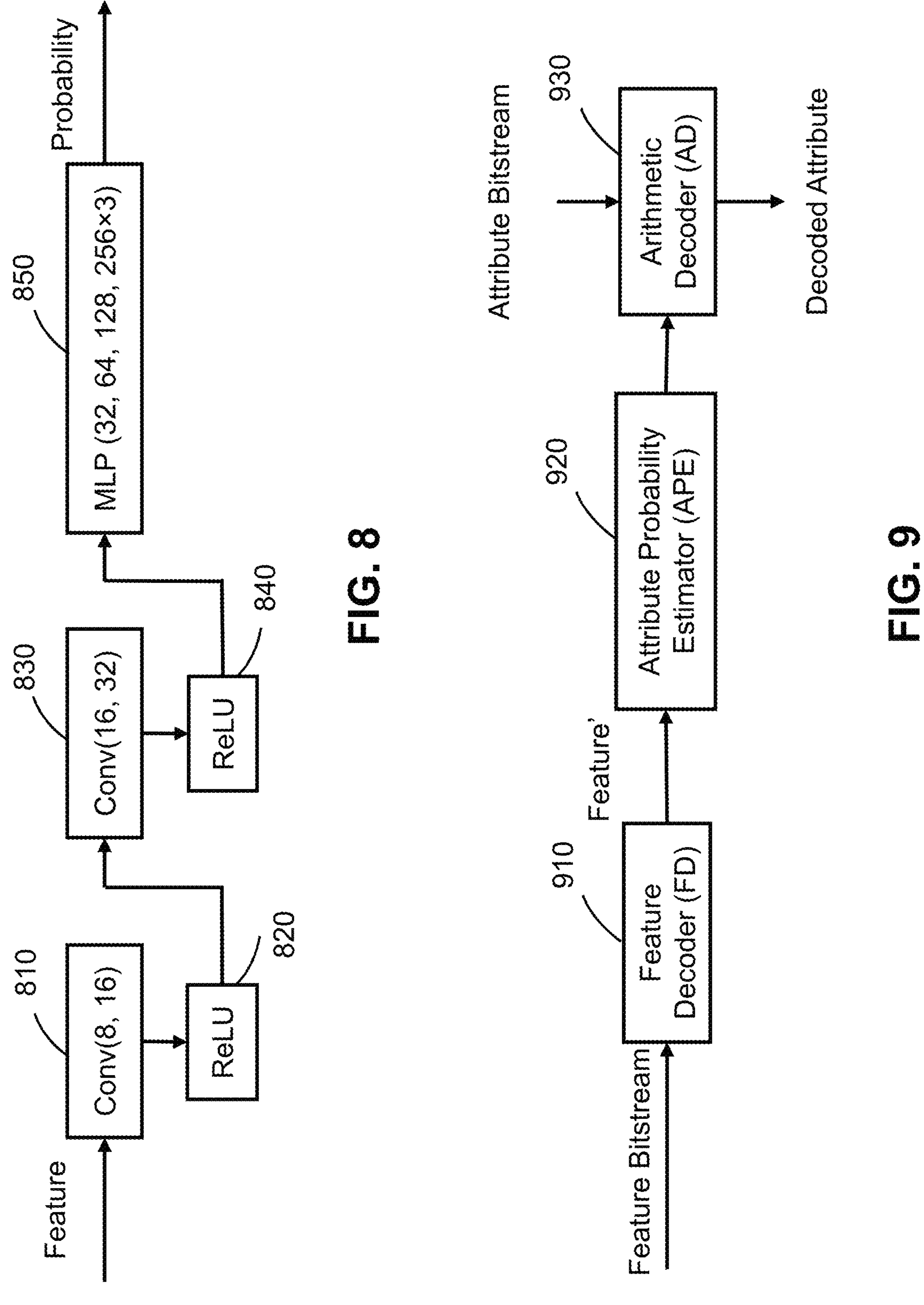
FIG. 8 illustrates an attribute probability estimator (in encoder and decoder)
FIG. 9 illustrates octree-based attribute decoding using a learning-based method.

In this embodiment, a proposed attribute probability estimator (APE) (330) is shown in FIG. 8. Firstly, the feature map is further aggregated/refined by a few convolutional layers (two Conv layers, 810, 830), where a ReLU activation function (820, 840) is appended after each Conv layer to introduce non-linearity. After that, it is passed to a multilayer perceptron (MLP, 850) to finally compute the probability. In FIG. 8, the parameters (32, 64, 128, 256×3) for MLP indicates the channel size of the MLP layers. In the end, the attribute probability distribution is a (256×3)-dimensional vector, which corresponds to probabilities of the value to be selected from [0, 255] for the 3 RGB channels. In the case of reflectance attribute for LiDAR point cloud, the MLP output can be a (100×1)-dimensional vector assuming there are 100 different reflectance intensities level to be considered.

Octree-Based Attribute Decoding

FIG. 9 illustrates a decoding method corresponding to the encoding method illustrated in FIG. 3, according to an embodiment. A feature decoder (FD, 910) decodes a feature from the input bitstream. This is different from the previous methods where the decoding starts with a feature aggregator. In these previous methods, the same process to obtain the feature is performed both at encoder and decoder side.

In the decoder illustrated on FIG. 9, it begins with a feature decoder (910). Basically, the decoder relies on a coded feature rather than to extract the feature from scratch by itself. The decoder benefits from a more representative feature as the features were extracted using finer level of details than from the parent level as in the previous methods.

An attribute probability estimator (APE, 920), which is the same as the APE (330) in FIG. 3, computes an attribute probability of a next octree voxel. Based on the estimated probability, the arithmetic decoder (AD, 930) determines the attribute values of the next octree voxel.

Feature Decoder Using Uniform Quantization

Figures 10, 11:
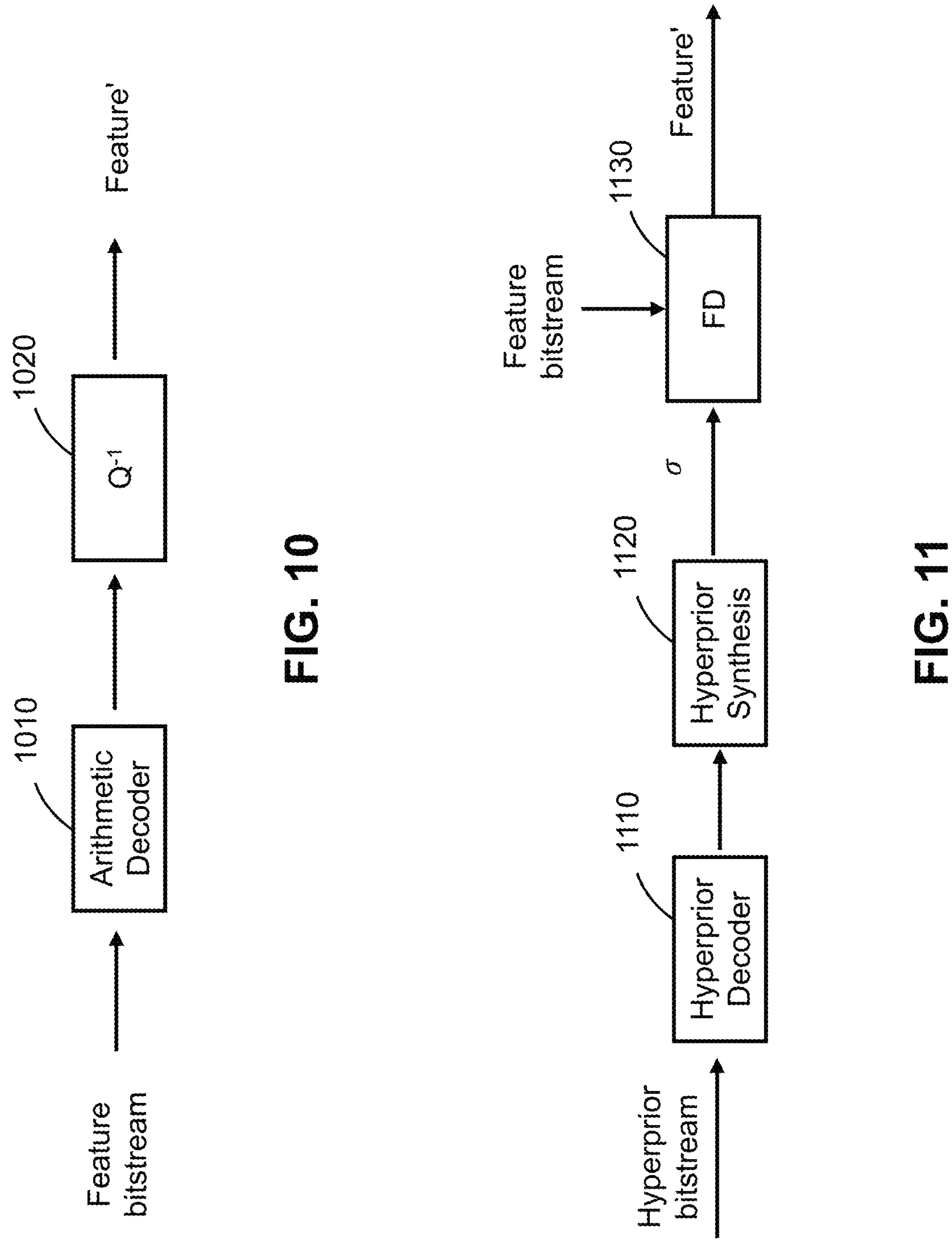
FIG. 10 illustrates a feature decoder with de-quantization.
FIG. 11 illustrates a feature decoder using hyperprior decoder.

In this embodiment, a feature decoder (910) is shown in FIG. 10. This is the corresponding decoding of the encoder as shown in FIG. 6. Specifically, the input bitstream is arithmetically decoded (1010). Next, a dequantization step (1020) is conducted to output the decoded features. Note in another embodiment, the dequantization step (1020) is bypassed.

Feature Decoder Using Hyperprior Decoding

In this embodiment, a feature decoder (910) is shown in FIG. 11. This decoder corresponds to the encoder as shown in FIG. 7.

In particular, the coded hyperprior feature is arithmetically decoded (1110) from a bitstream. The hyperprior feature is sent to a "hyperprior synthesis" module (1120) to generate the distribution parameters. In the embodiment shown in FIG. 11, the distribution parameters include the variance. In another embodiment, the distribution parameters include both the mean and the variance parameters. The features coded in a bitstream are arithmetically decoded (1130) based on the estimated hyperprior parameters.

Note that the "hyperprior synthesis" (1120) and "hyperprior decoder" (1110) are the same as the models (740) and (730) in FIG. 7. The "FD" (1130) is the arithmetic decoder of feature that corresponds to the "FE" the arithmetic encoder (750) of feature in FIG. 7.

Conditional Feature Encoder and Decoder

Figures 15, 16:
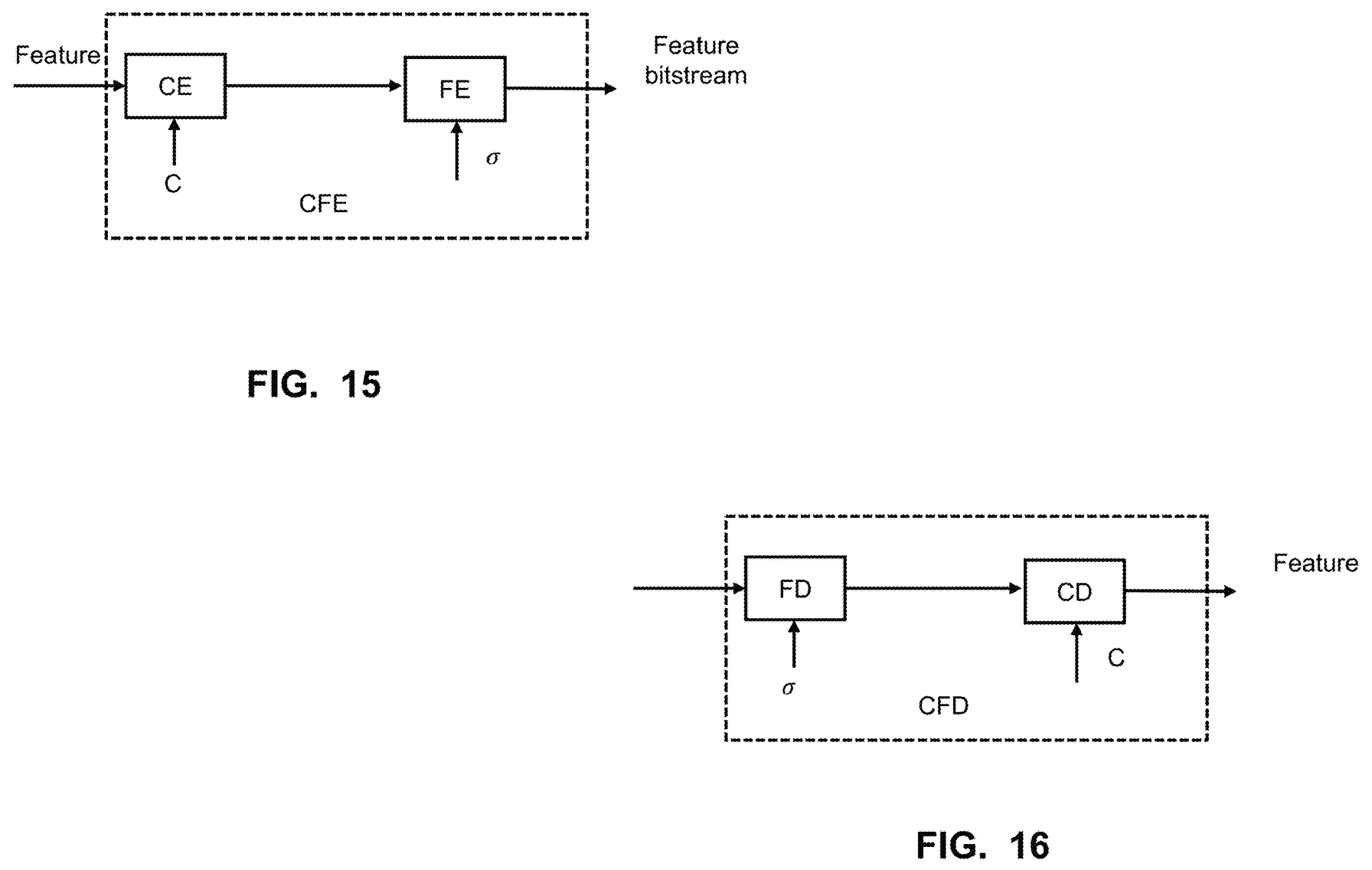

In another variant, the feature encoder (320) and feature decoder (910) with the hyperprior model are additionally paired with a conditional encoder (CE) and conditional decoder (CD) modules, respectively. FIG. 15 illustrates an example of a conditional feature encoder CFE and FIG. 16 illustrates an example of a conditional feature decoder CDE that can respectively replace the feature encoder and feature decoder. The feature encoder FE of the CFE (conditional feature encoder) and feature decoder FD of the CFD (conditional feature decoder) are the FE (320) and FD (910) but an additional conditional encoding (CE) and conditional decoding (CD) with an additional input conditional feature (C) is performed respectively. On the encoding side, the conditional encoding (CE) provides an updated feature to encode by the feature encoder FE. While, on the decoding side, the conditional decoding (CD) provides an updated decoded feature.

In the examples illustrated on FIG. 15 and FIG. 16, the feature encoder FE and feature decoder FD take as input estimated hyperprior parameters as described with FIG. 7. However, this input is optional and the conditional feature encoder CFE and conditional feature decoder CFD can operate in other variants without these hyperprior parameters.

Figure 17:
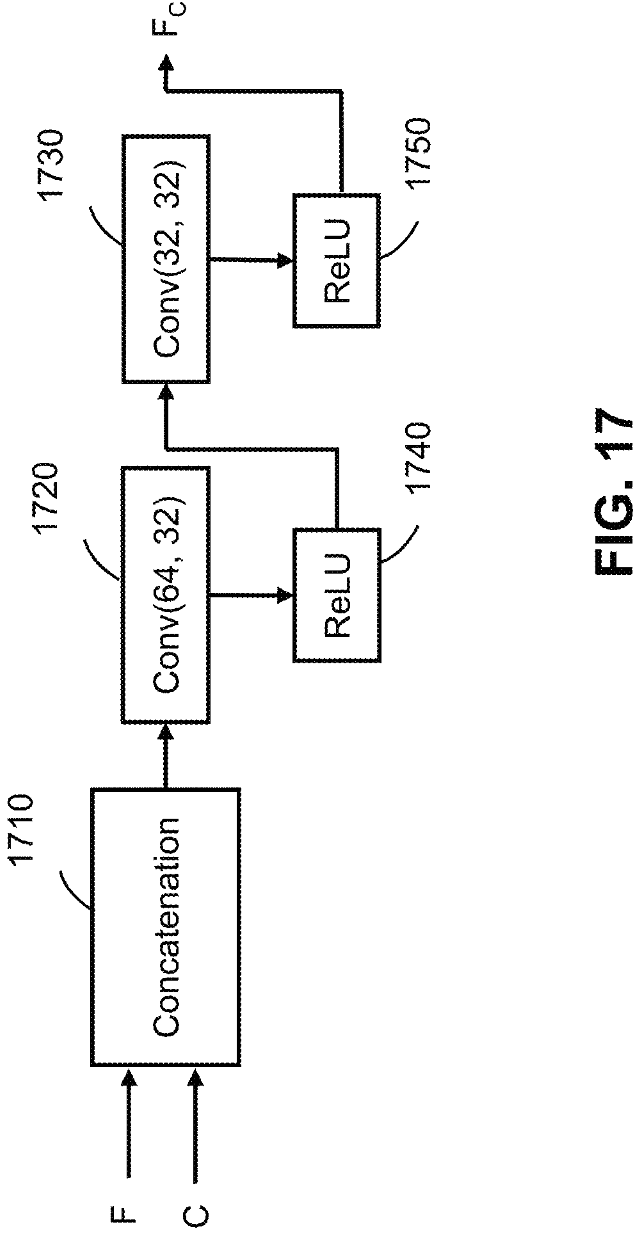
FIG. 17 illustrates a conditional encoder/decoder, according to an embodiment.

The design of CE and CD is exactly the same and is depicted in FIG. 17. The input features to CE/CD F (feature to be encoded or decoded feature) get concatenated (1710) with a context/conditional feature (C) followed by feature mixing via convolutional layers (1720, 1730) where a ReLU activation function (1740, 1750) is appended after each convolutional layer to introduce non-linearity. The conditional encoder/decoder (CE/CD) outputs the updated feature ($F_c$).

In a variant, the conditional feature (C) can be a feature extracted from the (decoded) attributes of the previous levels. In another variant, the conditional feature can be a geometry feature obtained from the known point cloud geometry.

Tree-Based Attribute Coding in a Full Compression Framework

Figure 14:
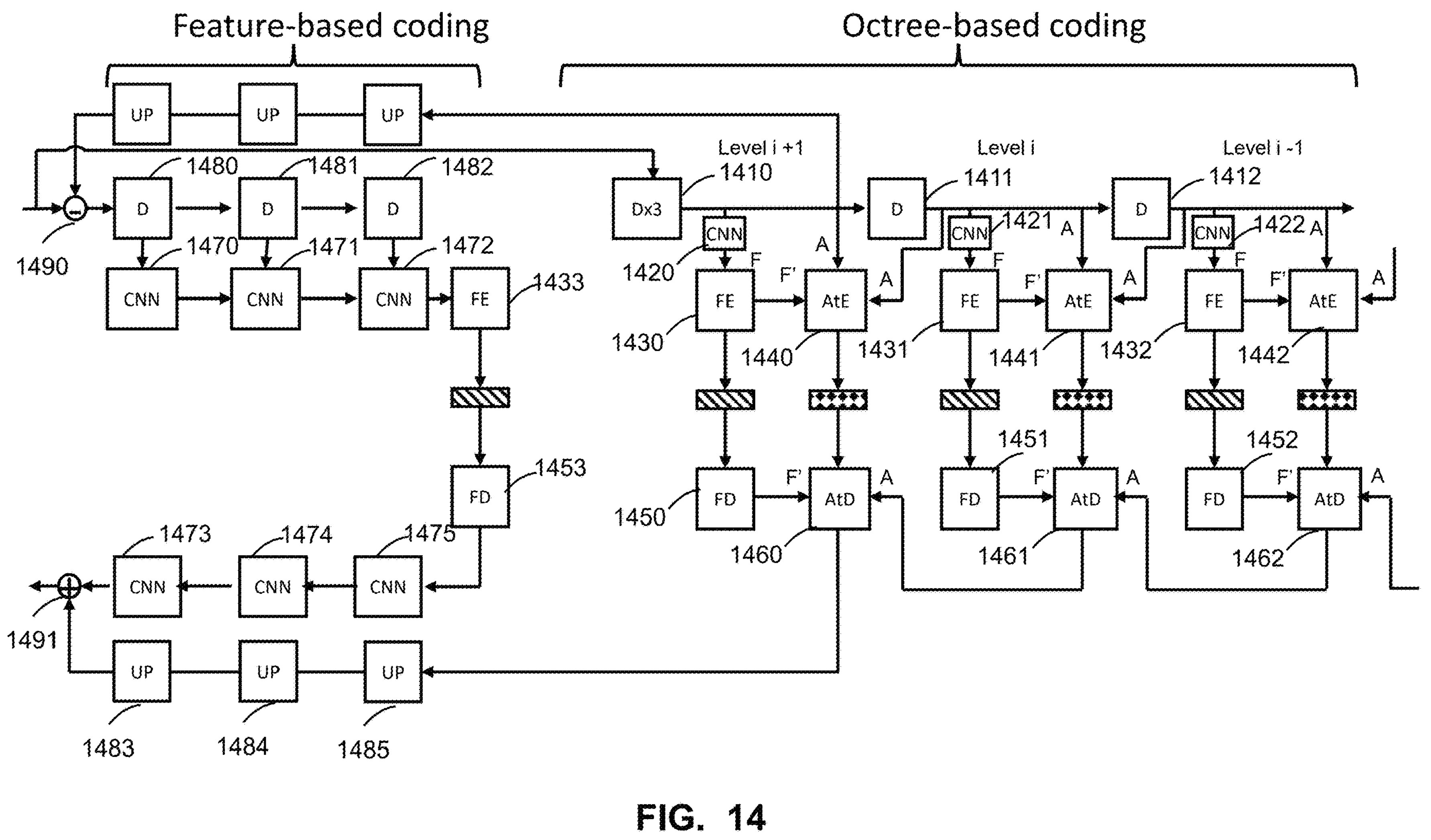
FIG. 14 illustrates an octree-based attribute coding and feature-based attribute coding framework.

FIG. 14 illustrates a full point cloud attribute compression framework which is an intra-only framework and encodes/decodes each point cloud frame separately by itself.

In full point cloud attribute compression framework illustrated on FIG. 14, the octree-based attribute coding is used to code the coarser level of point clouds (i.e., point cloud octree partitions) that requires lossless coding for an exact reconstruction. In one embodiment illustrated on FIG. 14, the octree-based attribute coding is concatenated with a feature-based coding method. It leads to an overall lossy compression solution.

In another embodiment, when the octree-based attribute coding method is applied to code all octree levels, it leads to a full lossless compression solution. They are shown as in FIG. 14 with the "feature-based" coding being removed and only keeping the "octree-based coding" portion.

In the example of FIG. 14, attributes of the coarser portion of the point cloud are encoded with octree-based attribute coding and attributes of the remaining finer portion of the point cloud are encoded by feature-based attribute coding. Since the octree-based attribute coding is lossless, its upsampled version is used to compute the residual input for feature-based encoding and, also used to obtain the overall lossy attribute reconstruction by adding its upsampled version to the lossy residual from feature decoding. In FIG. 14 (right part), we assume the final level of octree-based coding is level i+1 and coding for levels i−1, i and i+1 are illustrated.

The methods described in relation with FIG. 2-11 can be implemented in such a tree-based point cloud attribute compression framework wherein the attribute encoder from FIG. 3 and the attribute decoder from FIG. 9 operate a current level of the octree to encode and respectively decode the attribute values of the voxels of the current level.

Feature-Based Coding in the Overall Lossy Compression Framework

In the follows, we briefly describe the feature-based coding block as shown on the left part of FIG. 14. The encoder of the feature-based coding is shown in the top left part of the figure. It has a few CNN-like neural network (1470, 1471, 1472) and a few downsampling modules (1480, 1481, 1482). Instead of extracting and encoding features based directly on the input point cloud with attributes, in the framework illustrated on FIG. 14, the feature is extracted from a residual between the input point cloud and the (naively) upsampled lossless reconstruction from a specified level, which is the final level of octree-based encoding (i+1 in the example of FIG. 14).

The CNN-like neural network (1470, 1471, 1472) extract and aggregate a feature map from a residual (1490) between the input point cloud at the finest level of details and the specified level. The residual is obtained as a difference (1490) between attribute values of the point cloud at the finest level of details and attribute values from an upsampled version of the point cloud from the specified level (i+1 in the example of FIG. 14).

The specified level is the level until which octree-based attribute coding is applied starting from the root node. In the example of FIG. 14, octree-based attribute coding is applied from level 0 (coarser level) to level i+1. The remaining levels (from the specified level i+1 to the finest level of details) are coded by feature-based attribute coding. For example, in FIG. 14, feature-based attribute coding is applied on the last three levels of the octree structure.

For the feature extraction and aggregation, the resolution of residual is typically downsampled via pooling operations in the downsampling modules (D, 1480, 1481, 1482)) followed by CNN-like neural network modules (1470, 1471, 1472). Finally, the extracted feature is sent to a "Feature Encoder" (FE) module (1433) to output a bitstream.

The decoder is shown in the bottom left part of the figure. It has a few CNN-like neural network (1473, 1474, 1475) and a few upsampling modules (1483, 1484, 1485). They correspond to the few CNN-like neural network modules (1470, 1471, 1472) in the encoder. The CNN-like neural network modules (1473, 1474, 1475) reconstruct the corresponding residual of the input level and the specified level via upsampling/unpooling and feature aggregation, the residual being obtained as the output of the feature decoder (FD, 1453) that takes as input the bitstream output by the feature encoder FE (1433). The feature encoder module FE and feature decoder module FD can correspond to the FE (320) and FD (910) and can be implemented using any one of the variants described herein.

The reconstructed residual output by the last CNN-like neural network (1473) can be seen as an attribute prediction for the voxels of the finest level of details of the point cloud. Attribute values of the point cloud are then obtained by adding (1491) the reconstructed residual output by the CNN-like neural networks (1473, 1474, 1475) and the attribute values from the upsampled version of the point cloud from the specified level (1483, 1484, 1485).

The CNN modules can be enhanced or replaced by MLP or some other neural network modules, such as the Inception ResNet (IRN) or Transformer blocks.

Octree-Based Coding in the Full Compression Framework

Octree-based coding in the full compression framework is illustrated on the right part of FIG. 14. The encoder is shown in the top part of the figure, the decoder is shown in the bottom part of the figure.

Note that the downsampling modules (1411, 1412) in the top consecutively downsample the point cloud from the child(s) level for feature extraction/aggregation, unlike other prior methods which upsample from the parent level during encoding. The downsampling for the finest lossless level (1410) downsamples k times, directly from the input point cloud. In the example of FIG. 14, k is set to 3. This is a result that in the octree-based attribute coding wherein the features extracted by the CNNs (1420, 1421, 1422) are encoding into bitstreams. This encoding is reflected by the feature encoding modules FE (1430, 1431, 1432) in FIG. 14. These feature encoder modules FE correspond to the FE (320) and can be implemented using any one of the variants described herein. As for the FE (320), the feature encoding modules FE (1430, 1431, 1432) output on one hand a bitstream encoding the extracted feature F and on the other hand a reconstructed version F' of the extracted feature F.

In the example of FIG. 14, feature extraction is performed by the CNNs (1420, 1421, 1422). These can correspond to any of the variants of Feature aggregator (FA, 310) described in the relation with FIG. 3, FIG. 4 and FIG. 5.

Also note that the direction to perform feature extraction by CNNs is from left to right. It indicates that the feature extraction is based on a finer level of octree. Note all voxels in the current level may also be used since the encoder has access to the whole octree. For the earlier methods that don't transmit feature bitstream, they cannot use any voxel not yet encoded/decoded for feature extraction.

We note that although the feature extraction proceeds from left to right, i.e., from a finer to a coarser level, the encoding/decoding process still needs to be done from right to left, i.e., from a coarser level to a finer level, because the finer level attribute information is built on top of a known coarser level. Thus, during encoding/decoding, we first perform the feature extraction from left to right. Then we perform encoding/decoding from right to left, level-by-level, based on the extracted features.

In the example of FIG. 14, for octree-based coding, the feature aggregation/propagation is not done across several levels. Instead, the features are extracted by the CNN (1420, 1421, 1422) solely based on the point cloud at the current resolution, e.g., level i. The extracted feature map is to be encoded by FE (1430, 1431, 1432). Then the reconstructed version F' of the feature map is used to assist the octree-based attribute encoding AtE (1440, 1441, 1442). In another example, the feature aggregation/propagation could be done across several levels.

Figure 12:
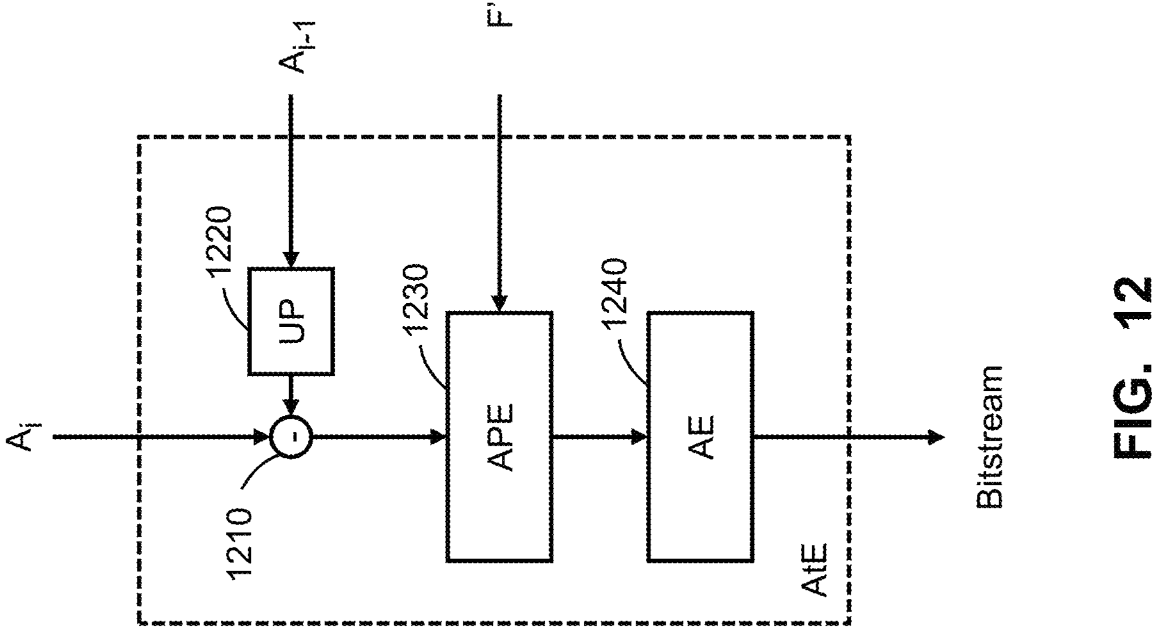
FIG. 12 illustrates an attribute encoder (AtE)

In octree-based attribute encoding AtE (1440, 1441, 1442), the attribute values are encoded as residual of attribute values (as shown in FIG. 12) between the input (downsampled attributes at the considered level, for example level i) and the (naively) upsampled version from the lossless reconstruction from the parent level (upsampled reconstructed attributes from level i−1). This residual of attribute values on the encoder side is for example illustrated in FIG. 12 (1220).

On decoder side, the feature F' is decoded by module FD (1450, 1451, 1452). These feature decoder modules FD correspond to the FD (910) and can be implemented using any one of the variants described herein. The decoded feature F' is used to assist the octree-based attribute decoding AtD modules (1460, 1461, 1462). The decoded attribute values are considered as residuals and are added on top of the upsampled lossless reconstruction from the parent level, as shown in FIG. 13 (1340).

The CNN modules (1420, 1421, 1422) can be enhanced or replaced by MLP or some other neural network modules, such as the Inception ResNet (IRN) or Transformer blocks.

An example of a module AtE (1440, 1441, 1442) from FIG. 14 is described in FIG. 12 and corresponds to blocks APE (330) and AE (340) in FIG. 3, with details shown in FIG. 12. The reconstructed feature (output from the CNN and encoded-decoded by FE) in FIG. 14 is provided to APE (1230) within AtE to assist the encoding of the residual attribute for a current voxel at level i. The residual attribute is obtained as the difference (1210) between the attribute of the voxel at level i and the upsampled (1220) attribute from level i−1. "$A_i$" denotes the attribute information at level i and "F'" denotes the reconstructed version of the feature map.

Figure 13:
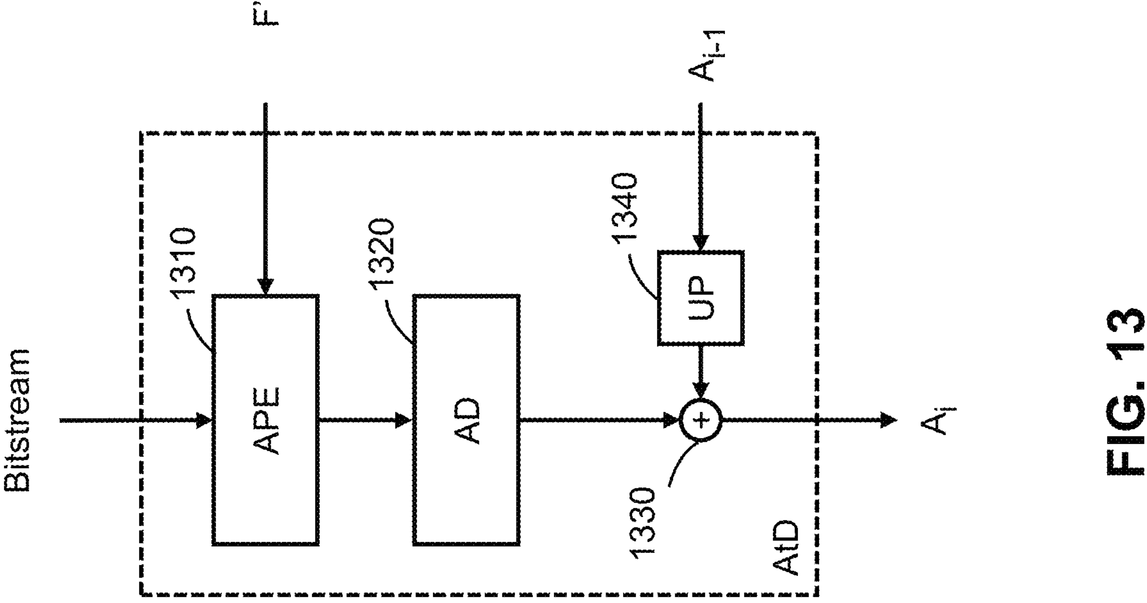
FIG. 13 illustrates an attribute decoder (AtD)

An example of a module AtD (1460, 1461, 1462) from FIG. 14 is described in FIG. 13 and corresponds to block APE (920) and AD (930) in FIG. 9, with details in FIG. 13. The decoded feature output by FD in FIG. 14 is provided to APE (1310) within AtD to assist the decoding of the residual attribute. The attribute of the voxel at level i is reconstructed by adding (1330) the upsampled (1340) attribute from level i−1 to the decoded attribute residual.

It should be noted here that upsampling can be achieved in several ways. In one embodiment the upsampling can be a traditional module with nearest neighbor or repeat based upsampling. In another embodiment, the upsampling can be a learning-based module based on CNN, ResNet, IRN or Transformer architectures. Additionally, since the geometry is assumed to be known at all levels during attribute coding, the upsampling has embedded pruning to match the geometry at level i.

Dynamic Point Cloud Attribute Compression

Point cloud compression is used in many practical applications, such as autonomous driving, AR/VR, etc. Also, point cloud data can consist of geometry and attribute information acquired over a period of time. In this case, point cloud data is dynamic. A dynamic point cloud can comprise a sequence of point cloud frames or point clouds, wherein a point cloud or a point cloud frame represents geometry and attributes of the point cloud at a time instant.

In the following, a dynamic point cloud attribute compression method is described that differs from previous methods in that it unifies the motion estimation and motion compensation of the lossy (feature-based) and lossless (octree-based) attribute coding.

The dynamic point cloud attribute compression method provided herein provides a more efficient way to code attributes of a dynamic point cloud in a tree structure. In the proposed encoder, it utilizes the finer level of details to extract motion feature from a current point cloud frame and a reference point cloud frame. The extracted features are then used to generate a predicted feature, which facilitates the coding of the feature of the current point cloud. The inter coding can occur in each octree level, which fully utilizes the interdependency between point cloud frames to enhance the coding performance.

Figure 18:
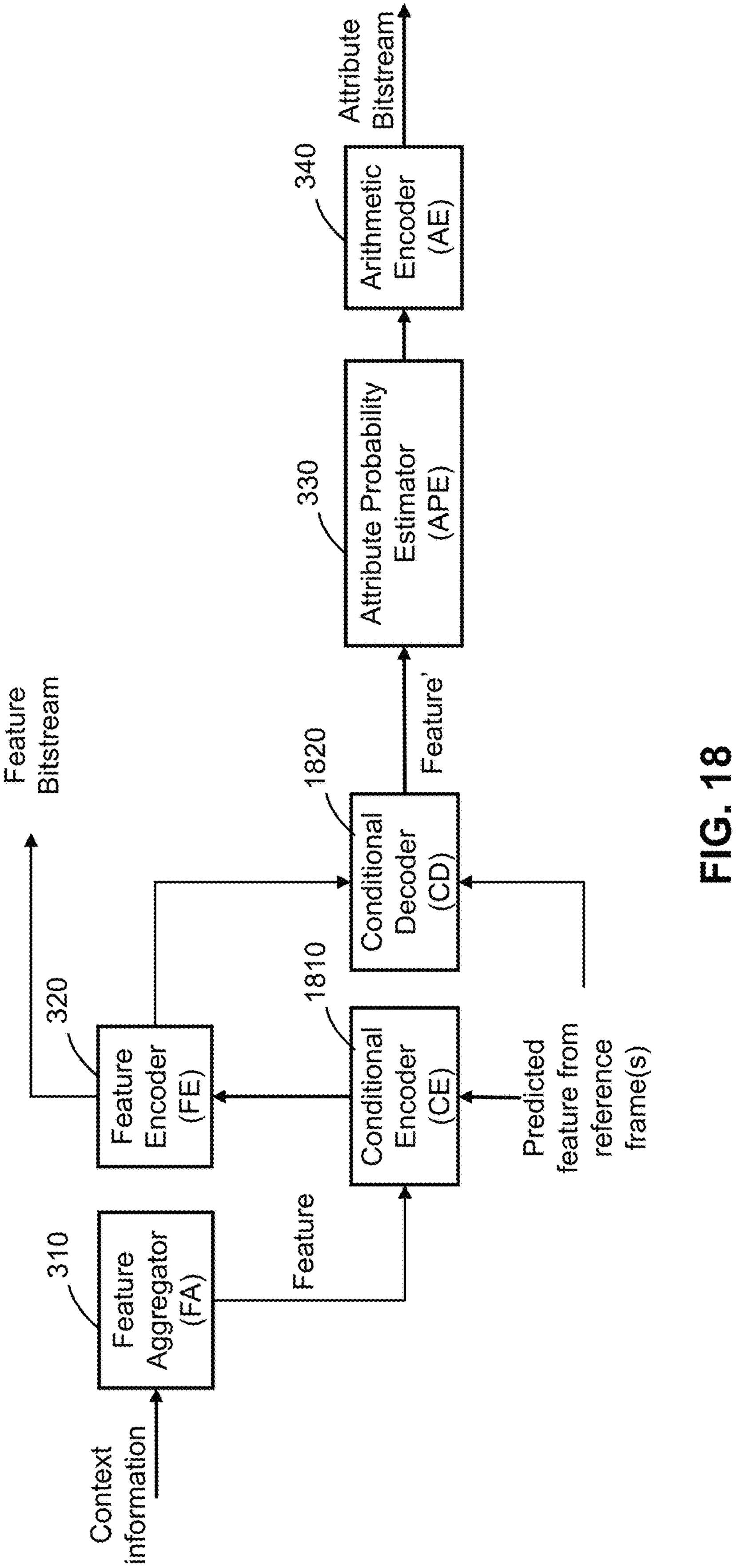
FIG. 18 illustrates an attribute encoding with known geometry for inter coding.
Figure 19:
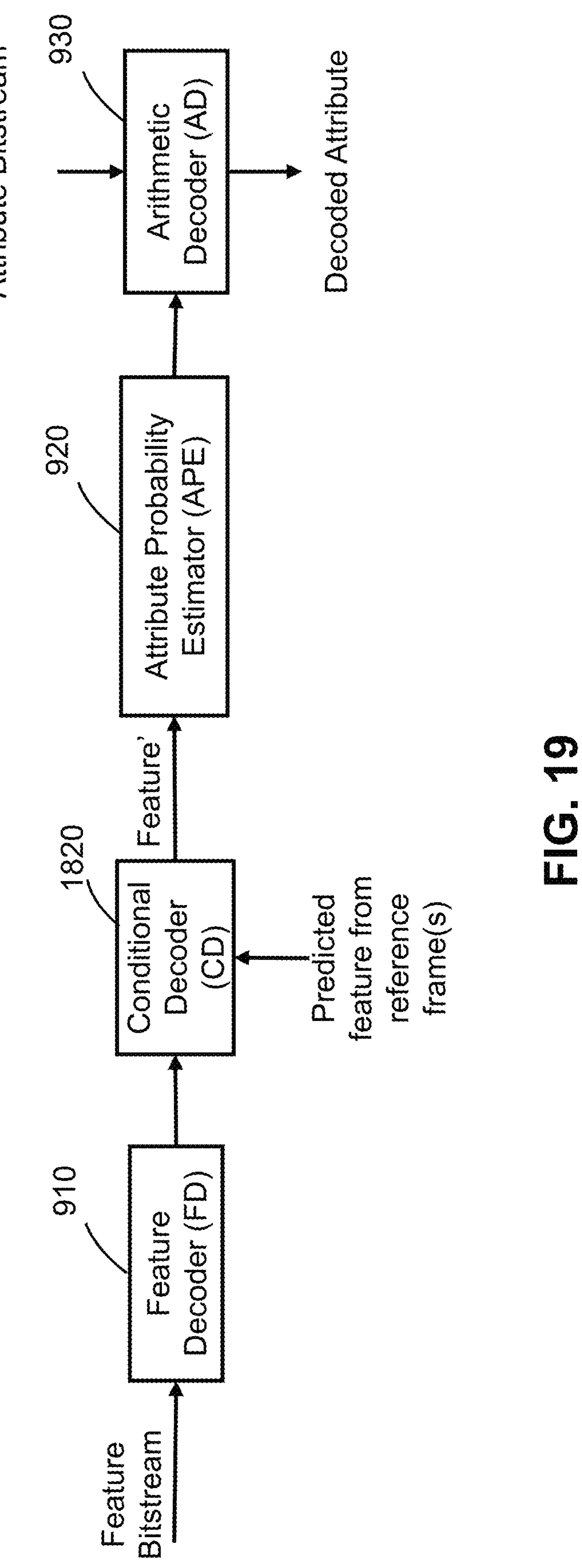
FIG. 19 illustrates an attribute decoding with known geometry for inter coding.

FIG. 18 and FIG. 19 respectively illustrate the encoding and decoding methods. As for the FIG. 3 and FIG. 9, FIG. 18 and FIG. 19 respectively illustrates an embodiment of an attribute encoder and of an attribute decoder for encoding and decoding attributes of voxels of a level i of the tree structure illustrated on FIG. 2 for example.

Compared to FIG. 3, FIG. 18 introduces two additional modules (1810, 1820) which are respectively a conditional encoder (CE) module and a conditional decoder (CD) when encoding the feature output from the feature aggregator (310, FA). In this embodiment, a predicted feature is obtained from one or more reference frame(s). A reference frame is a previously reconstructed point cloud frame. The predicted feature serves as a prediction of the current feature of the current point cloud frame. The conditional encoder (CE) module (1810) aims at removing the redundant information from the current feature which is already conveyed by the predicted feature. In this way, the output of the conditional encoder (CE) module (1810) contains less information and become easier to encode by the feature encoder module FE (320), leading to a smaller bitstream.

The output of the conditional encoder (CE) module (1810) can be seen as a residual feature between the feature of the current point cloud frame and the predicted feature obtained from the reference point cloud frame. In order to obtain the reconstructed feature Feature' that is used by the Attribute Probability Estimator (330, APE), the conditional decoder (CD, 1820) takes the reconstructed version of the residual (the encoded-decoded version of the output of CE) and the predicted feature from the reference point cloud frame to output the reconstructed version Feature' of the current feature. The use of conditional coding (CE/CD) for the current feature at the encoder side not only reduce the data to encode the current feature but also provides a reconstructed feature Feature' to the APE module (330) that is more informative for the APE module (330) to encode the attributes.

Similarly, compared to FIG. 9, FIG. 19 introduces the additional module (1820) which is the same conditional decoder (CD) module as for FIG. 18 when decoding the feature output from the feature decoder (910, FD). The feature decoder (FD, 910) decodes the bitstream to provide the decoded version of the feature which can be seen in this embodiment as a residual feature between the current feature of the point cloud frame and the reference point cloud frame.

Given the reference frame(s), the same predicted feature as that on the encoder side (FIG. 18) is obtained, the predicted feature serves as a prediction of the current feature for the voxel attributes. The conditional decoder CD (1820) aims at adding back the necessary information from the predicted feature to the decoded feature output by the feature decoder (FD, 910), so that a reconstructed feature Feature' describing the voxel attributes at the current level can be obtained. In this way the output of CD (1820) can be readily used for subsequent attribute probability estimation for the octree-based decoding of attributes.

The structure of the conditional encoder CE (1810) and of the conditional decoder CD (1820) is the same as the one described with FIG. 17. The context/conditional input of the conditional encoder/decoder from FIG. 17 is in that case the predicted feature (that is the feature from the reference frame).

Method in a Full Compression Framework

Figure 25:
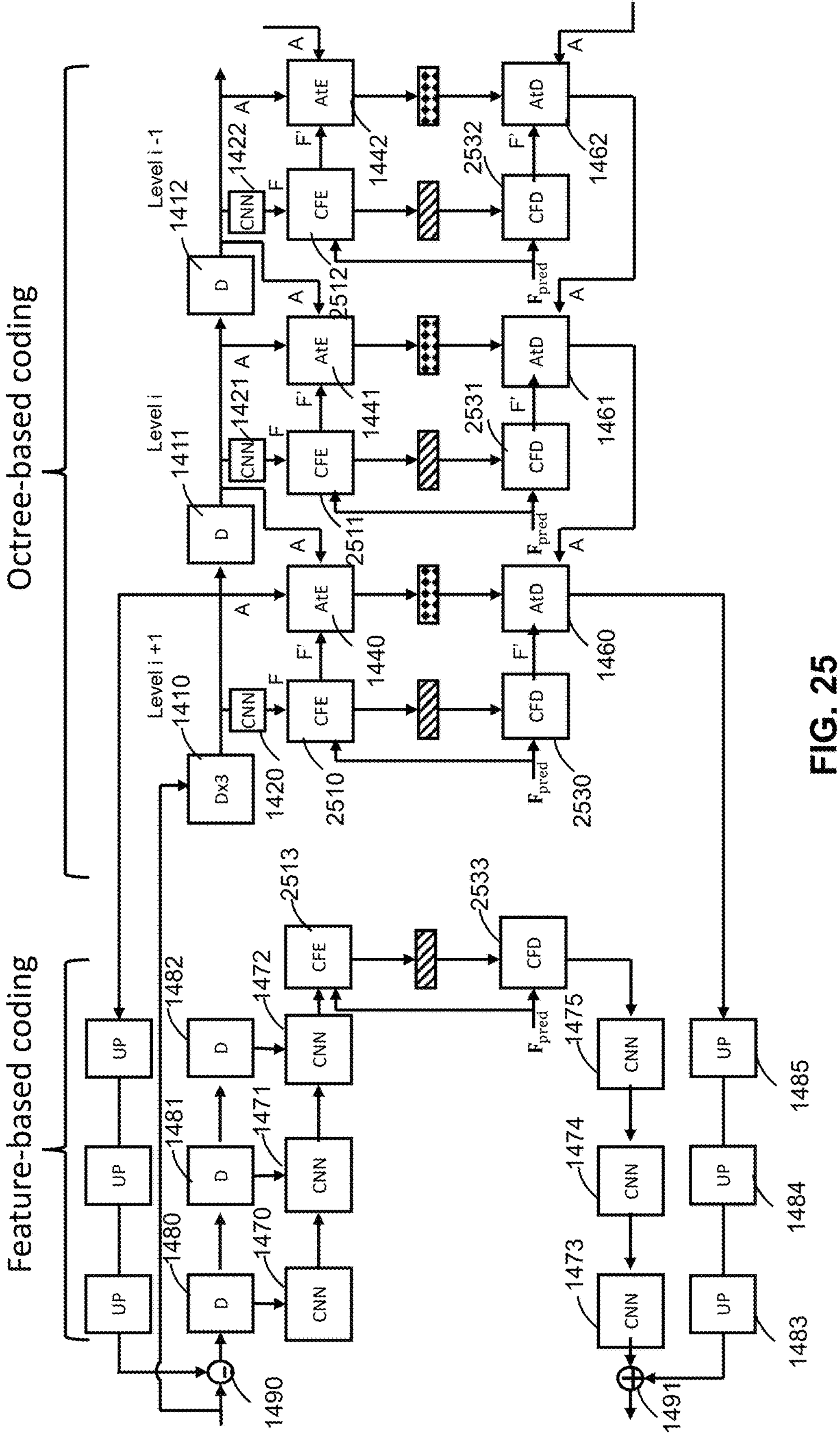
FIG. 25 illustrates an octree-based attribute coding and feature-based attribute coding framework.

The full point cloud compression framework provided herein consists of two branches: an inter-branch (shown in FIG. 20 and FIG. 21) as well as the main branch (FIG. 25).

Inter Coding Branch

In this subsection, we briefly describe the inter coding branch of the proposed compression system. The encoder part of the inter coding branch is provided in FIG. 20 while the decoding part of the inter coding branch is provided in FIG. 21.

Encoding: Given a current point cloud $PC_{cur}$ and a reference point cloud $PC_{ref}$, the inter coding branch on the encoder side aims at extracting the predicted feature $F_{pred}$ from the attribute information for each octree level, given the geometry. First, the top of FIG. 20 has a few CNN-like neural network modules. They basically extract and aggregate feature maps respectively from the current and the reference point cloud attributes. During the feature extraction and aggregation, the resolution of the input is typically downsampled.

Next the extracted current feature (F) and the extracted reference feature ($F_{ref}$) are sent to a motion estimation block (ME) which outputs a motion feature $F_{mot}$. The motion feature represents the dynamics between the two input point cloud frames, which is fed to the feature encoder (FE) module for encoding as a motion bitstream $BS_{mot}$. The motion bitstream is decoded by a feature decoder (FD) module, leading to the reconstructed motion feature $\hat{F}_{mot}$. $\hat{F}_{mot}$ and reference feature ($F_{ref}$) are then fed to another module that we call the predictor generator module (PG) for estimating a predicted feature $F_{pred}$. The predictor generator module is essentially performing motion compensation for the reference feature according to the motion depicted in the reconstructed motion feature $\hat{F}_{mot}$.

Figure 22:
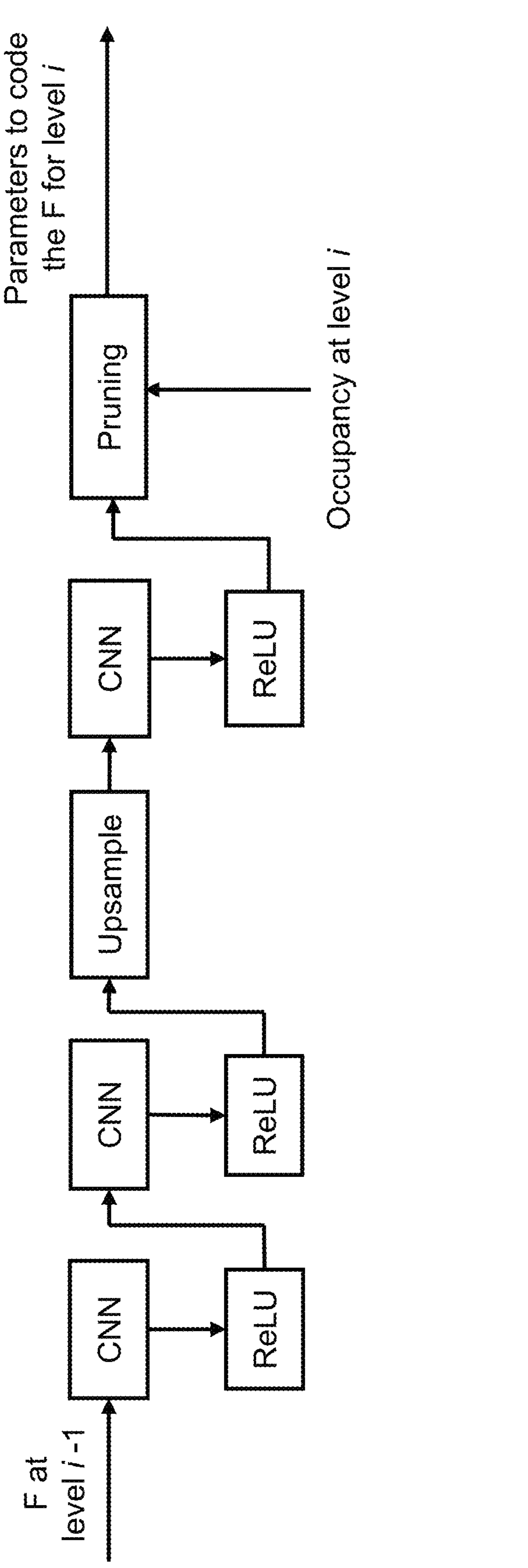
FIG. 22 illustrates an example of a parameter estimation module.

We note that the encoding and decoding of the motion feature is based on a module that we call the parameter estimator (PE) which essentially estimates the mean (and optionally, the variance) from the previous reconstructed motion feature. The parameter estimator PE module shown in FIG. 22 is essentially inspired by the hyperprior model described in FIG. 7 and FIG. 11. However, instead of sending an additional bitstream for the hyperprior, here the parameters are estimated from the previous level. The parameter estimator PE module performs some initial feature aggregation via convolutions (CNN, ReLU) upon an input feature F at level i−1. Then the feature is upsampled to level i followed by additional convolution (CNN, ReLU). This additional convolution generates a set of parameters. Finally, a pruning is performed to remove the parameters on empty voxels since the geometry is previously encoded/decoded. The usage of the parameter estimator PE modules at each level constitutes a hierarchical hyperprior model for encoding/decoding the motion feature.

In the end, the inter coding branch, on one hand, output the motion bitstream; on the other hand, outputs the predicted feature $F_{pred}$ for the main encoding branch to perform encoding.

Figure 20:
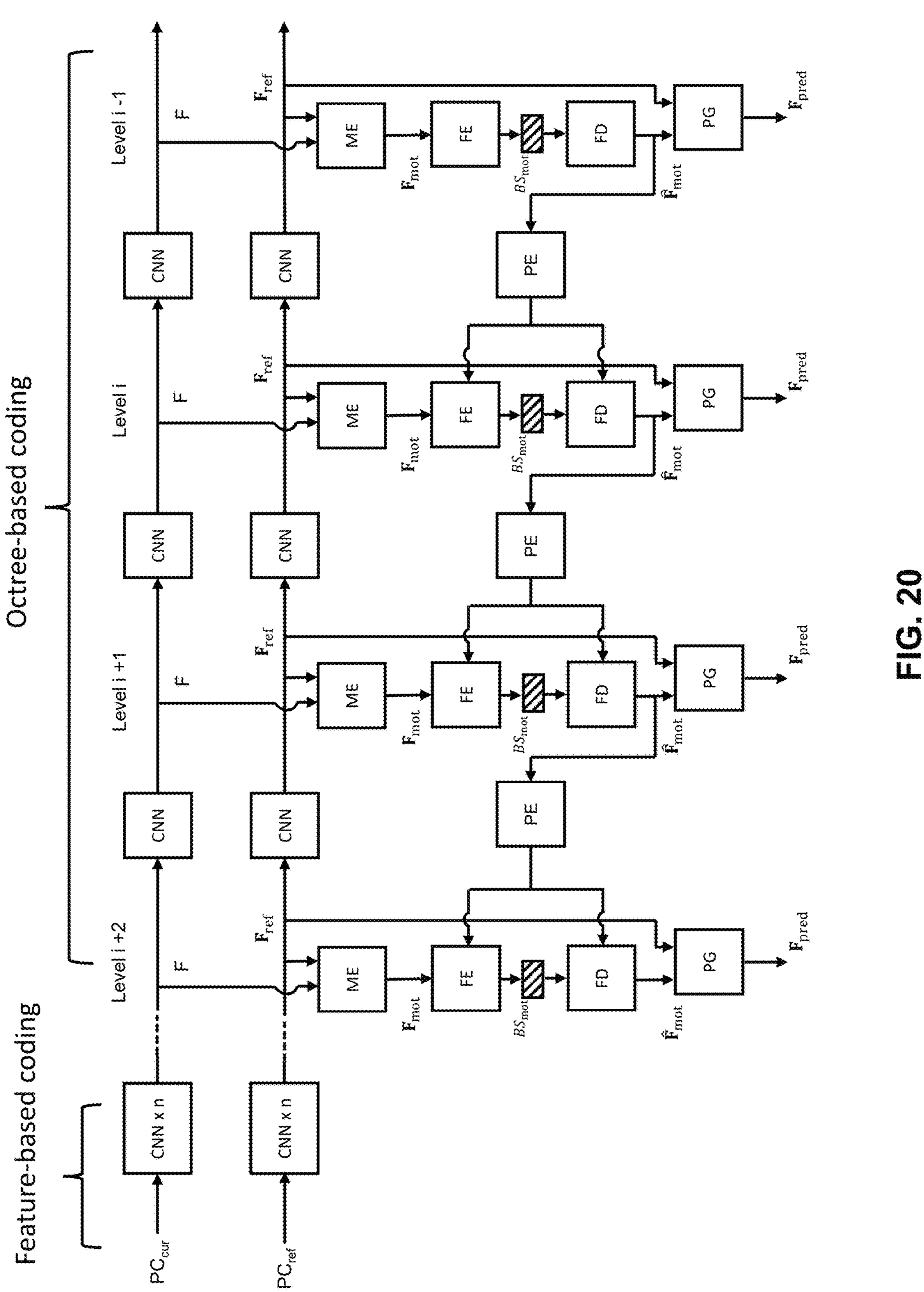
FIG. 20 illustrates an example of a hierarchical inter encoding branch.
Figure 21:
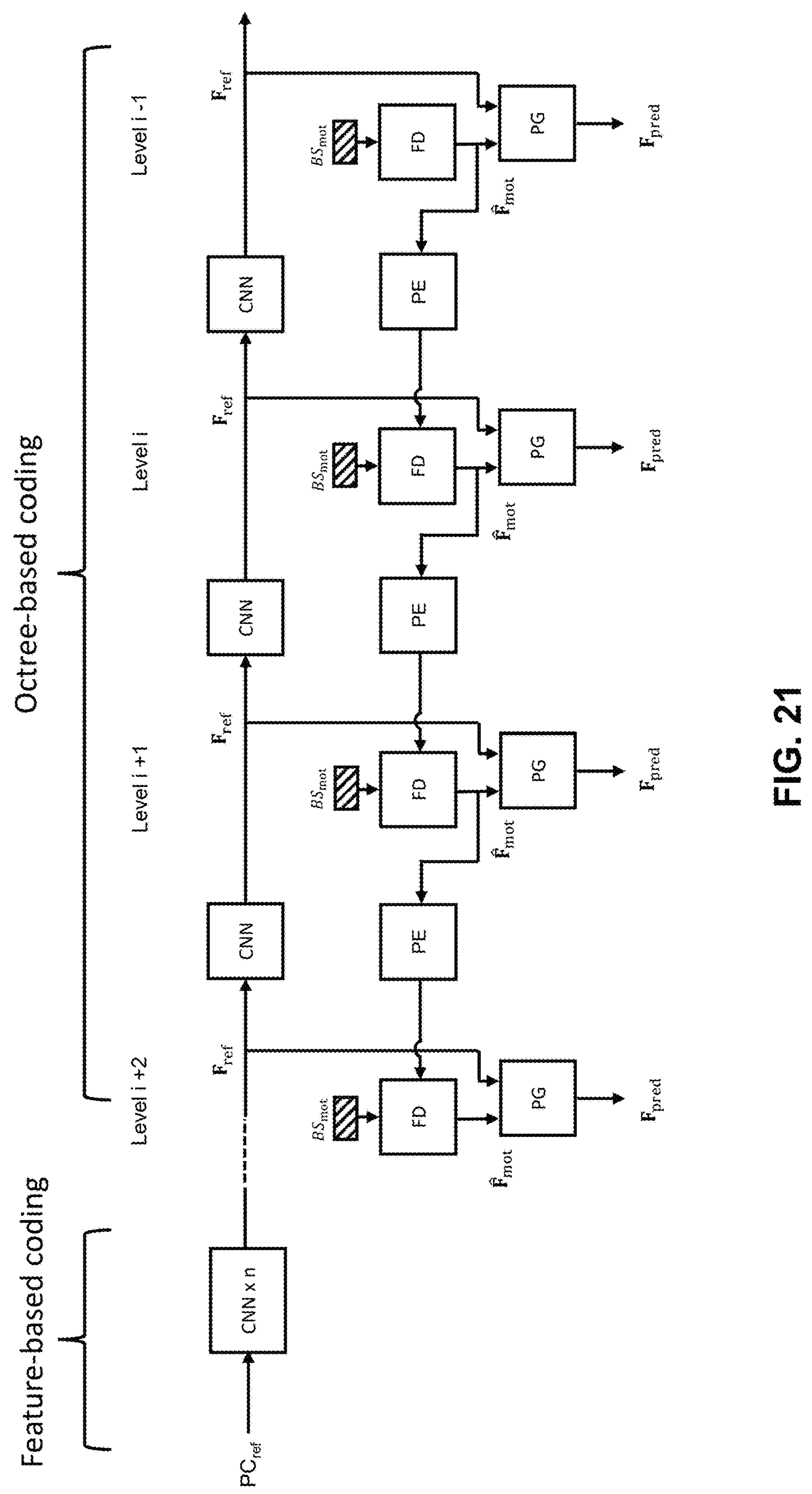
FIG. 21 illustrates an example of a hierarchical inter decoding branch.

Decoding: the decoding part of the inter-coding branch is provided in FIG. 21. Compared to the encoding part (FIG. 20), the decoding part is simpler. For each octree level, it decodes the motion bitstream $BS_{mot}$ with the feature decoder module FD and obtain the reconstructed motion feature $\hat{F}_{mot}$.

After that, the predictor generator PG is applied to $\hat{F}_{mot}$ and the reference feature $F_{ref}$, leading to the predicted feature for the main decoding branch.

We note that in the encoder part (FIG. 20) and decoder part (FIG. 21), an alternative design is to replace the inputs to the CNN modules at the octree-based coding part by the point clouds downsampled to the associated level. For instance, for the current feature F (in FIG. 20) and reference feature $F_{ref}$ (in both FIG. 20 and FIG. 21) at level i+1 which are to be fed to their corresponding CNN modules, these two features can be replaced with $PC_{cur}$ and $PC_{ref}$ that are downsampled to level i+1, respectively. Similarly, all the other F's and $F_{ref}$'s are replaced by $PC_{cur}$ and $PC_{ref}$ downsampled to the corresponding level. In this way, the dependency of the feature extraction is broken, and the training of the inter coding branch becomes easier.

Motion Estimation and Predictor Generator

Figure 23:
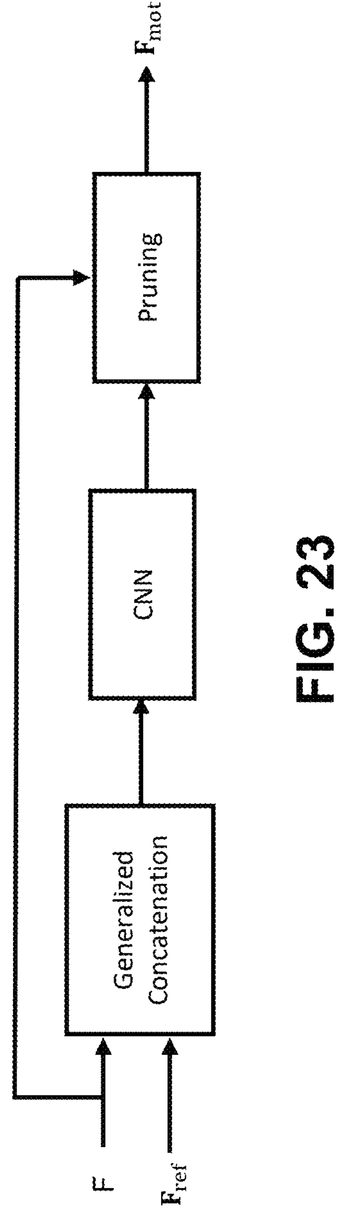
FIG. 23 illustrates an example of a motion estimation module.
Figure 24:
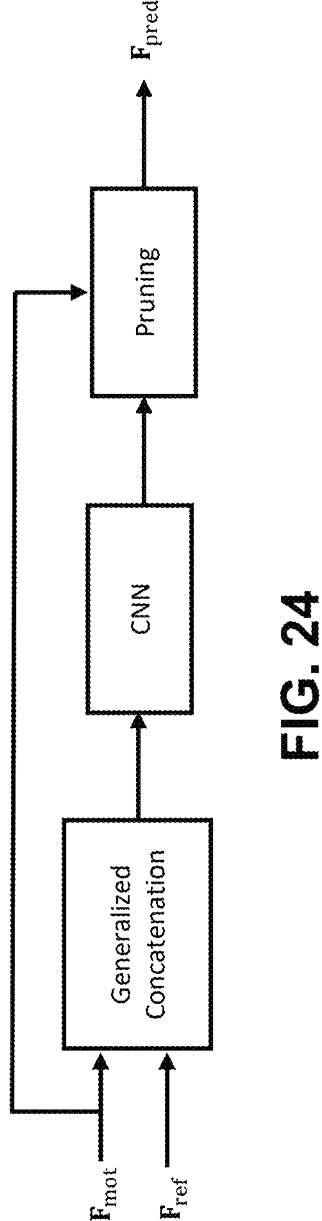
FIG. 24 illustrates an example of a predictor generator module.

The diagrams of the proposed motion estimation and the predictor generator are provided in FIG. 23 and FIG. 24, respectively.

The motion estimation module takes the current feature F and the reference feature $F_{ref}$ as inputs, and it is first fed to a generalized concatenation module which is capable of concatenating two sparse tensor with different coordinates.

The generalized concatenation module outputs a tensor as described below. The concatenated feature map at a 3D coordinate u is defined as $$F_{out}(u) = \begin{cases} Concat(F(u), F_{ref}(u)) & u \in B_{cur} \cap B_{ref} \\ Concat(0, F_{ref}(u)) & u \notin B_{cur} \text{ and } u \in B_{ref} \\ Concat(F(u), 0) & u \in B_{cur} \text{ and } u \notin B_{ref} \end{cases}$$

Where $B_{cur}$ and $B_{ref}$ are the coordinates of the current point cloud and the reference point cloud, respectively. $u \in B_{cur} \cup B_{ref}$, 0 is a vector with all zeros, "Concat" is the regular vector concatenation, $F_{cur}(u)$ is the feature vector of $F_{cur}$ defined at u, similarly for $F_{ref}(u)$ and $F_{out}(u)$. Note that in this way, the coordinates of $F_{out}$ becomes the union of $B_{cur}$ and $B_{ref}$, i.e., $B_{cur} \cup B_{ref}$.

The output feature map of the generalized concatenation module is then passed to a CNN block for feature aggregation, followed by a pruning module to removing coordinates that exists in $F_{ref}$ but not in the current feature F. Finally, the pruning module outputs the motion feature $F_{mot}$.

The predictor generator (FIG. 24) has a similar structure as the motion estimator. However, the input of the predictor generator is the motion feature $F_{mot}$ and the reference feature $F_{ref}$, the output is the predicted feature $F_{pred}$ which has a coordinate aligned with $F_{mot}$.

Main Coding Branch

The diagrams of the main coding branch are provided in FIG. 25, where left side of FIG. 25 depicts the feature-based attribute coding branch in the main branch, while right side of FIG. 25 depicts the octree-based attribute coding branch in the main branch.

For both feature-based attribute coding and octree-based attribute coding branches, compared to FIG. 14, when the predicted feature $F_{pred}$ is available, we feed both $F_{pred}$ and the extracted feature F, to the conditional feature encoder CFE (2510, 2511, 2512, 2513) for encoding of the feature and the attribute encoding (1440, 1441, 1442). On the decoder side, we feed both $F_{pred}$, and the decoded feature, to the conditional feature decoder CFD (2530, 2531, 2532, 2533) for reconstructing the feature and attribute decoding (1460, 1461, 1462). For the rest of the details, the main branch operation remains the same as FIG. 14.

The conditional feature encoder CFE (2510, 2511, 2512, 2513) is the same as the CFE described with FIG. 15, with the difference that the context/conditional feature C is the predicted feature $F_{pred}$. In addition, the feature encoded by the CFE is decoded and passed to the conditional decoder (CD) (not shown in FIG. 25) to reconstruct the feature F', as described with FIG. 18.

The conditional feature decoder CFD (2530, 2531, 2532, 2533) is the same as the CFD described with FIG. 17, with the difference that the context/conditional feature C is the predicted feature $F_{pred}$.

Additional Architectural Designs

It should be duly noted that the architecture shown in FIG. 25 is one example of a design of the main coding branch. Additional designs of the main coding branch wherein the inter-branch provided herein is introduced can be envisioned by taking any of the proposed main coding branch designs from the "402 application and if necessary replacing the feature encoder/decoder with the conditional feature encoder/decoder. Then, the predicted feature from the inter coding branch needs to be provided to the conditional encoder/decoder as an additional input.

Unified Feature-Based Coding and Octree-Based Coding

The feature-based attribute coding illustrated in FIG. 14 and FIG. 25 is a non-hierarchical coding. One bitstream is obtained for the last levels of the octree structure.

In another embodiment, the unified architecture can have a combination of the hierarchical and non-hierarchical feature-based attribute coding. In this case, hierarchical coding can be used to code several intermediate levels followed by non-hierarchical coding for the last few levels. Such combination of hierarchical and non-hierarchical coding can help to further reduce the overall bitrate consumption specially when the data is noisy. For noisy data, the high frequency information lives mainly on the last few levels and thus a single non-hierarchical bitstream for coding the last few levels can be sufficient. For example, if feature-based coding is to be used for the last K levels of the octree structure, with such a combination of hierarchical and non-hierarchical coding, separate bitstreams can be obtained for a given number of intermediate levels of the last K levels and one bitstream can be obtained from the remaining levels of the last K levels.

Intra Mode

In this embodiment, we enable the proposed framework of FIG. 25 to operate in the intra mode, where the reference point cloud is not available. In this case, the inter branch is not launched and only the main branch is used for encoding/decoding. Additionally, the predicted feature is set to be a constant feature where all of its entries are predefined. For example, one may let all of its entries be 1 (during both training and inference).

Parameter Sharing

In the design of FIG. 20, FIG. 21 and FIG. 25, the CNN blocks on the encoder side may have similar architectures, and the CNN blocks on the decoder side may also have similar architectures. Such similarity of network architecture provides for the following:

1) Let all the CNN blocks on the encoder side to share the same set of network parameters;
2) Let all the CNN blocks on the decoder side to share the same set of network parameters.

Without the proposed model sharing, the feature-based coding and octree-based coding needs two sets of separate neural networks parameters. It not only makes the overall parameter size larger but also requires retraining and reloading of the neural network parameters when the bottleneck level separating feature-based coding and octree-based coding is changed.

With this proposed embodiment, the feature-based (lossy) coding and octree-based (lossless) coding are additionally unified under the same set of encoder & decoder CNN pairs. During inference, the codec can be reconfigured while maintaining the conformance/compatibility using the same set of neural network parameters.

Motion Estimation with Multiple Resolutions

Figure 26:
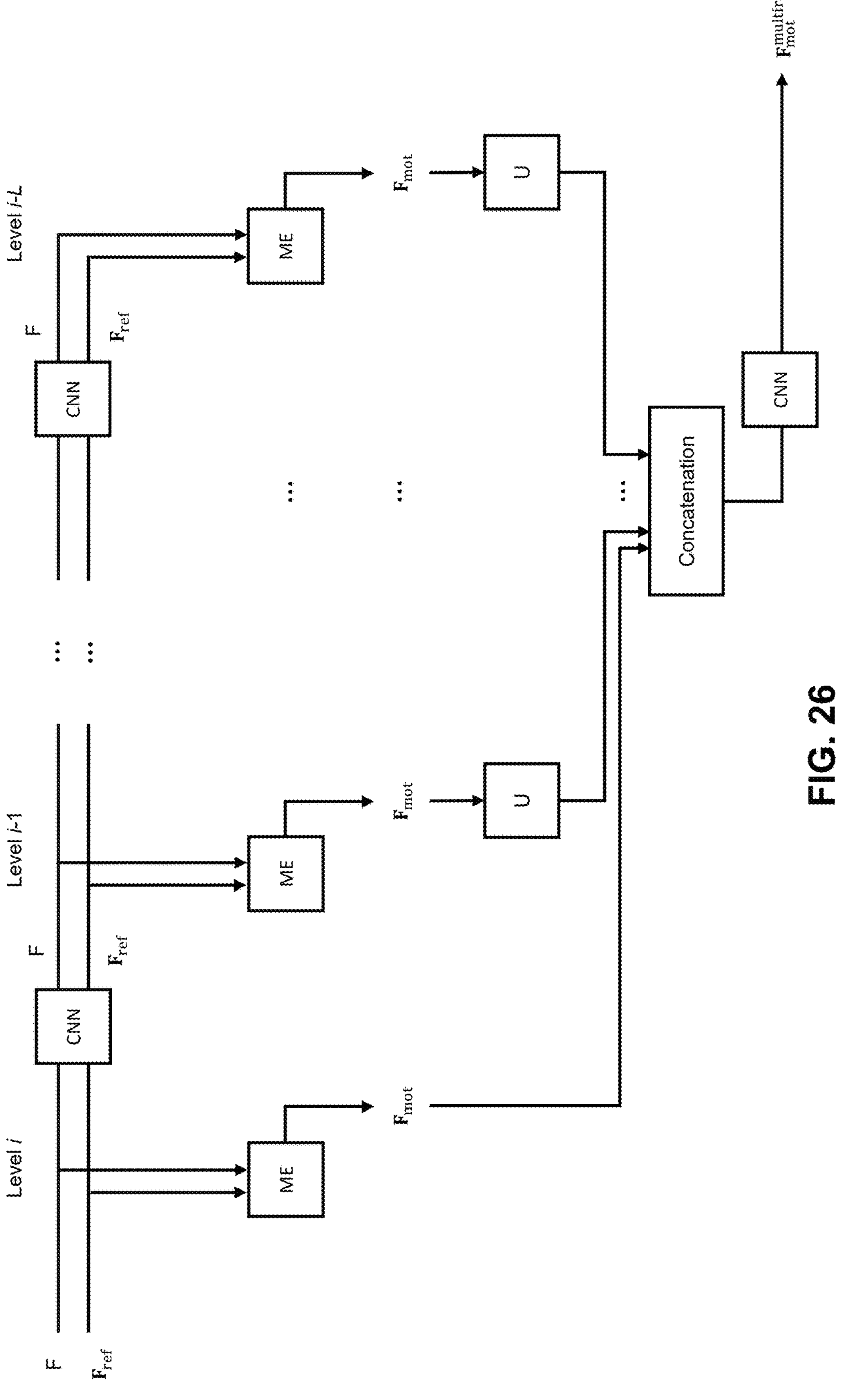
FIG. 26 illustrates a multiple resolutions motion estimation module.

In this embodiment, the motion estimation module is extended to consider more ancestor levels motions directly from a specific point cloud level. This is illustrated in FIG. 26. This, so called, multi-resolution motion estimation module, can combine L+1 levels of motions in one level motion feature. This enhanced architecture may be implemented by replacing each ME module illustrated in FIG. 20 with FIG. 25. This enhanced multi-resolution motion feature may be more efficient to code a motion feature with larger motion information in it.

As illustrated in FIG. 26, the input and output of the multi-resolution motion estimation are identical to the ME module illustrated in FIG. 20. This multi-resolution motion estimation block takes the current feature F and the reference feature $F_{ref}$ as inputs, then outputs a multi-resolution motion feature $$F_{mot}^{multires}.$$

The motion estimation (ME) module is additionally processed L-time for each ancestor level, from "Level i–1" to "Level i–L" and outputs motion features $F_{mot}$ of each level.

Apart from the "Level i" ME, the other MEs are required to downsample current feature F and reference feature $F_{ref}$ to the corresponding level from i–1 to i–L. Similar to that illustrated in FIG. 20, a CNN module extracting a downsampled feature is used. Then, after processing each motion estimation, the extracted motions may be upsampled to the initial level i of motion by processing with the modules U located from level i–1 to i–L. Here to upsample from level i–k to i, an U module consists of a series of k unpooling and pruning operators. After the U modules, the motion features are all aligned at the level i. These aligned motion features may be merged to one multi-resolution motion feature, $$F_{mot}^{multires}.$$

The merging process may be achieved by a series of concatenation and CNN in one embodiment.

A challenge in point cloud attribute compression is about how to extract expressive, representative point cloud attribute features with neural networks.

Traditional Point Cloud Attribute Coding

Figure 27:
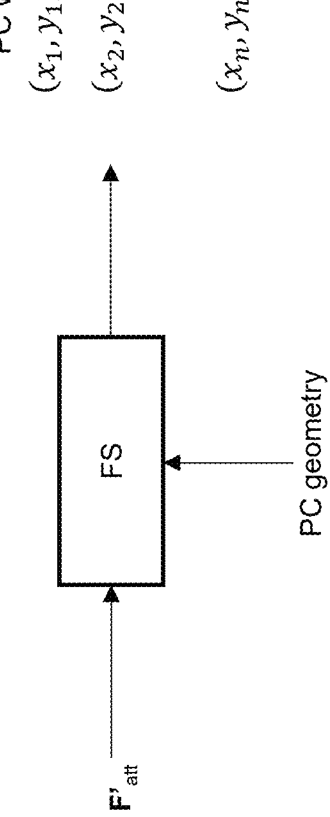
FIG. 27 illustrates an example of attribute analysis for encoding (top) and attribute synthesis for decoding (bottom)

Traditionally, a feature aggregator (FA) is applied to extract features from a point cloud with attribute, see for example top of FIG. 27. Particularly, the attribute can be color (e.g., in RGB color space or YUV color space), reflectance (collected from LiDAR), or normal vectors, etc. Every point $(x_i, y_i, z_i)$ in the point cloud (suppose there are n points) is attached with an attribute vector, e.g., $(r_i, g_i, b_i)$ to be compressed. Thus, given such a point cloud with attribute, the FA module on the encoder side outputs a (raw) attribute feature map $F_{att}$ which attempts to represent the attribute information attached on the geometry. In the attribute compression frameworks described above, the attribute feature map is encoded and transmitted to a decoder so that the decoded version $F'_{att}$ of the attribute feature map is available to the decoder.

On the decoder side, to reconstruct a point cloud, a decoded feature $F'_{att}$ associated with $F_{att}$ on the encoder side is obtained. Then a feature synthesis module FS is applied to recover the point cloud attribute, see FIG. 27 (bottom).

In practice, the FA module and the FS module are both based on neural networks, and they can either be a voxel-based module or a point-based module.

Figure 28:
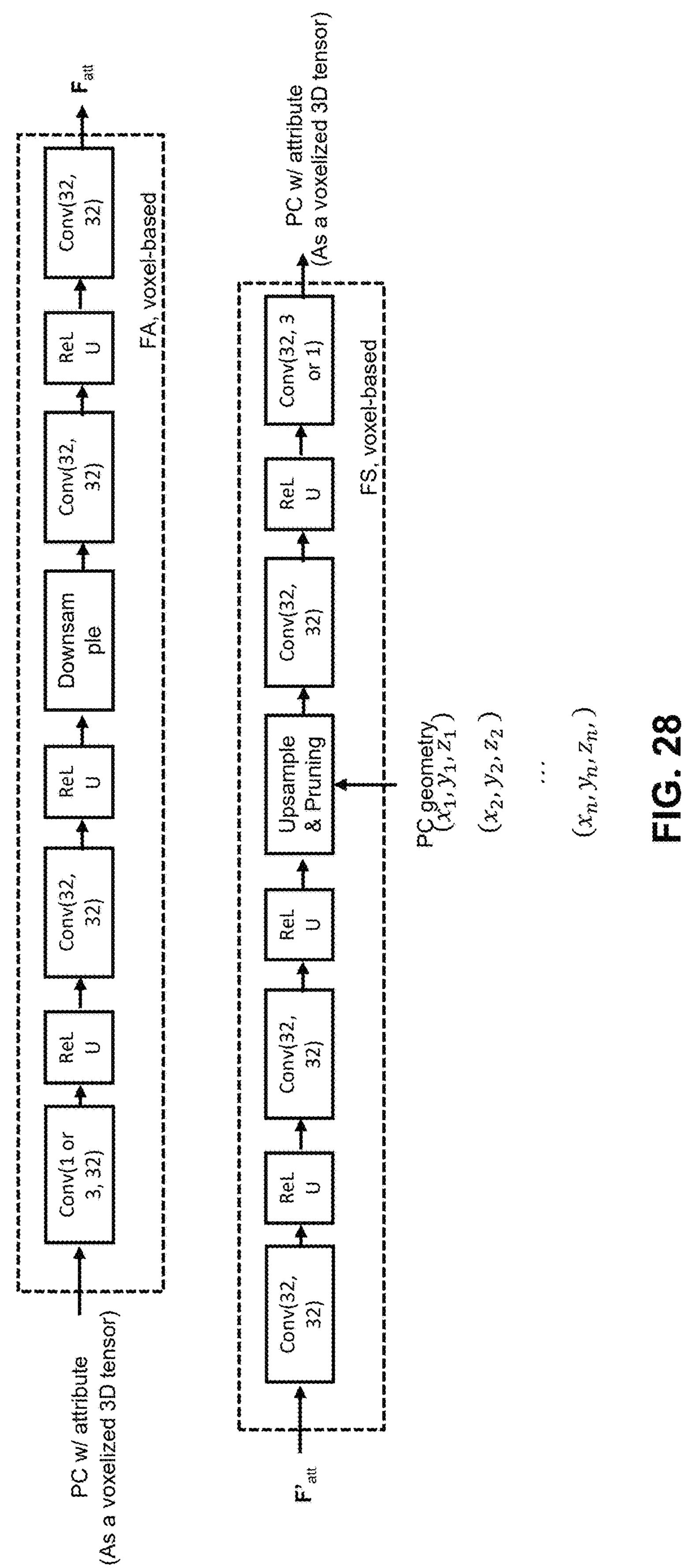
FIG. 28 illustrates an example of voxel-based feature aggregator (top) and voxel-based feature synthesis (bottom)

Feature Aggregator, voxel-based: Top part of FIG. 28 shows an example design of a voxel-based feature aggregator (FA). Firstly, the input to the voxel-based FA module is a point cloud with attribute information represented as a voxelized 3D tensors. In this case, for the occupied voxels, their associated attribute vectors (or scalar, if the attribute to be coded is 1-D such as reflectance) are attached to them. Such voxelized point cloud with attribute is fed to the FA module (top part of FIG. 27).

In this design, the feature aggregator (FA) is composed of several 3D convolutional layers (with downsample), i.e., the "Conv" blocks in FIG. 28, where Conv(a, b) means the input feature channel size is a while the output feature channel size is b. The "Downsample" block is to downsample the feature from (i+1)-th to the i-th level. In more advanced embodiments, the convolutional layers can be replaced with other commonly used feature aggregation blocks, such as an Inception ResNet (IRN) block, and a Voxel Transformer block, and these blocks can be repeated several times to enhance the feature aggregation performance.

The input to the FA module can be the voxelized point cloud with attribute information associated with it, for RGB color attribute, the input channel size can be 3; while for reflectance in LiDAR point cloud, the input channel size can be 1.

The output of the FA module is the attribute feature map $F_{att}$.

Feature Synthesis, voxel-based: Bottom part of FIG. 28 shows an example design of the voxel-based feature synthesis (FS). We note that the design of the FS is basically symmetric to the design of the voxel-based FA. We again apply multiple convolutional layers to refine the decoded feature map $F'_{att}$, and a convolutional layer at the end is appended to convert the feature back to the attribute. When the attribute is RGB color, the final output of the convolution has 3 channels. And when the attribute is reflectance, the final output of the convolution has only 1 channel. Note that an "Upsampling and Pruning" module is also inserted in the middle. It is to first apply an upsampling operator to revert its input feature back to the original resolution, then to prune/remove the coordinates that are not in the input geometry. The output of the "Upsampling and Pruning" module is a feature map with coordinates/geometry the same as the input point cloud.

Figure 29:
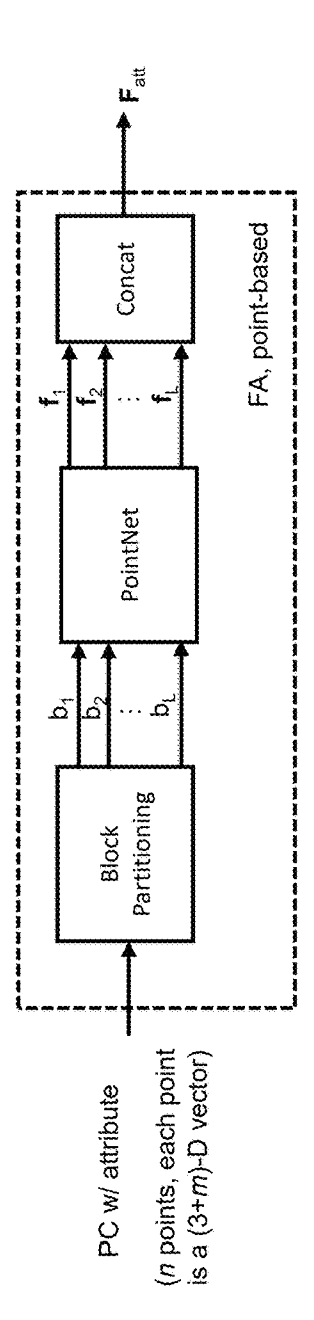
FIG. 29 illustrates an example of point-based feature aggregator (top) and voxel-based feature synthesis (bottom)
Figure 29:
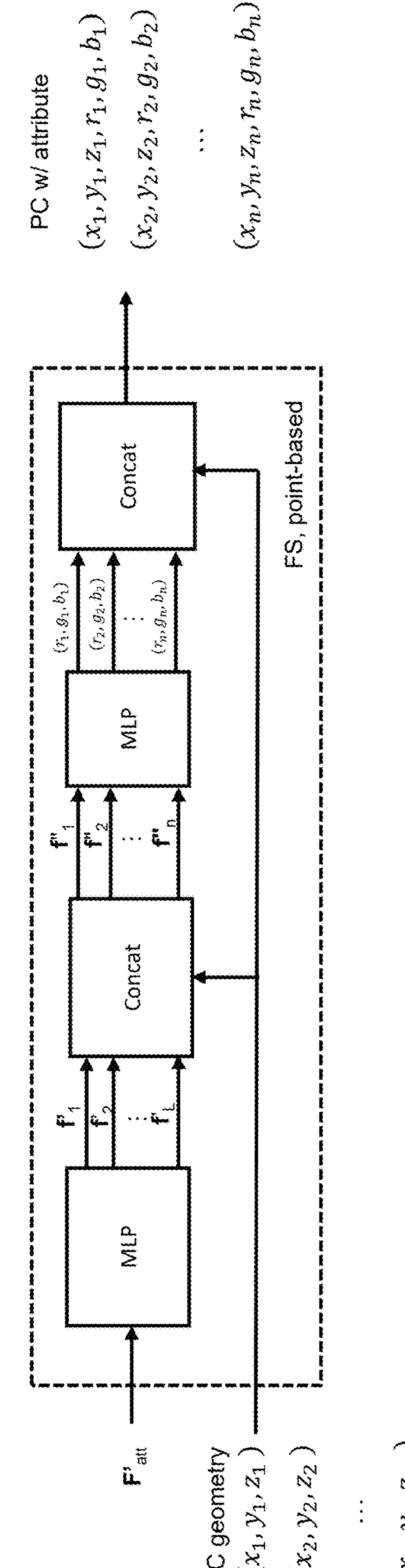

Feature Aggregation, point-based: Top part of FIG. 29 shows an example design of the point-based feature aggregator (FA). Suppose the attribute to be coded is a m-dimensional vector, then in this scenario, the input to the FA is a point set, where each point is represented as a (3+m)—vector. The first three dimensions are the (x, y, z) coordinates while the rest of the dimensions are the attributes to be coded, e.g., it may be organized as (x, y, z, r, g, b) if the RGB colors are to be coded.

Such a point cloud in the point-based representation is first passed to a block partitioning module which divides the input point cloud into L different point cloud chunks. Then each chunk, $b_1, b_2, \ldots, b_L$, will be fed to a PointNet architecture (described in Qi, Charles R., et al. "*PointNet: Deep learning on point sets for* 3*D classification and segmentation.*" *Proceedings of the IEEE conference on computer vision and pattern recognition.* 2017) to extract the associated features, leading to $f_1, f_2, \ldots, f_L$, these L feature vectors are then concatenated to form a 2-D feature map $F_{att}$. Here the PointNet architecture is configured to accept more than 3 dimensions so that it can digest attribute information in addition to geometry information.

Feature Synthesis, point-based: Bottom part of FIG. 29 shows the example design of the point-based feature synthesis (FS). Note that it also takes the known geometry as the input. Firstly, the input feature map $F'_{att}$ is processed by a series of MLP layers for refinement, leading to $f'_1, f'_2, \ldots, f'_L$. Next, we concatenate the n input 3D points (the known geometry) with their associated features in $\{f'_1, f'_2, \ldots, f'L\}$, leading to the updated features $\{f''_1, f''_2, \ldots, f''_L\}$. Then these updated features are fed to another set of MLP layers to reconstruct the attribute information (such as R, G, B) for each point. These reconstructed attributes of each point and the associated (x,y,z) coordinates constitute the final recovered point cloud with attributes.

Limitation of Traditional Method

The above method directly extracts the attribute feature map $F_{att}$ from the point cloud. In this case, the extracted feature map $F_{att}$ would also contain some geometry information because it is operated on the input geometry. However, to reduce redundancy and to make the extracted feature map more expressive, it is preferable to let the attribute feature only contain the attribute information. Embodiments are described below that provides a method for attribute compression wherein the geometry information is decoupled from the extracted feature map $F_{att}$ to have more expressive attribute features.

The method described below provides a more effective way to extract point cloud attribute features to benefit for point cloud attribute compression. A raw attribute feature extracted from a feature aggregator usually represents a mixture of both attribute information and geometry information. It is desired to remove the known geometry information mixed in the raw attribute feature so that the bitstream size encoding the attribute feature map can be reduced. To achieve this purpose, a geometry feature map is computed, and conditional coding is used to remove the geometry information from the attribute feature, so as to improve the coding efficiency.

Overall Design

Figures 30, 31:
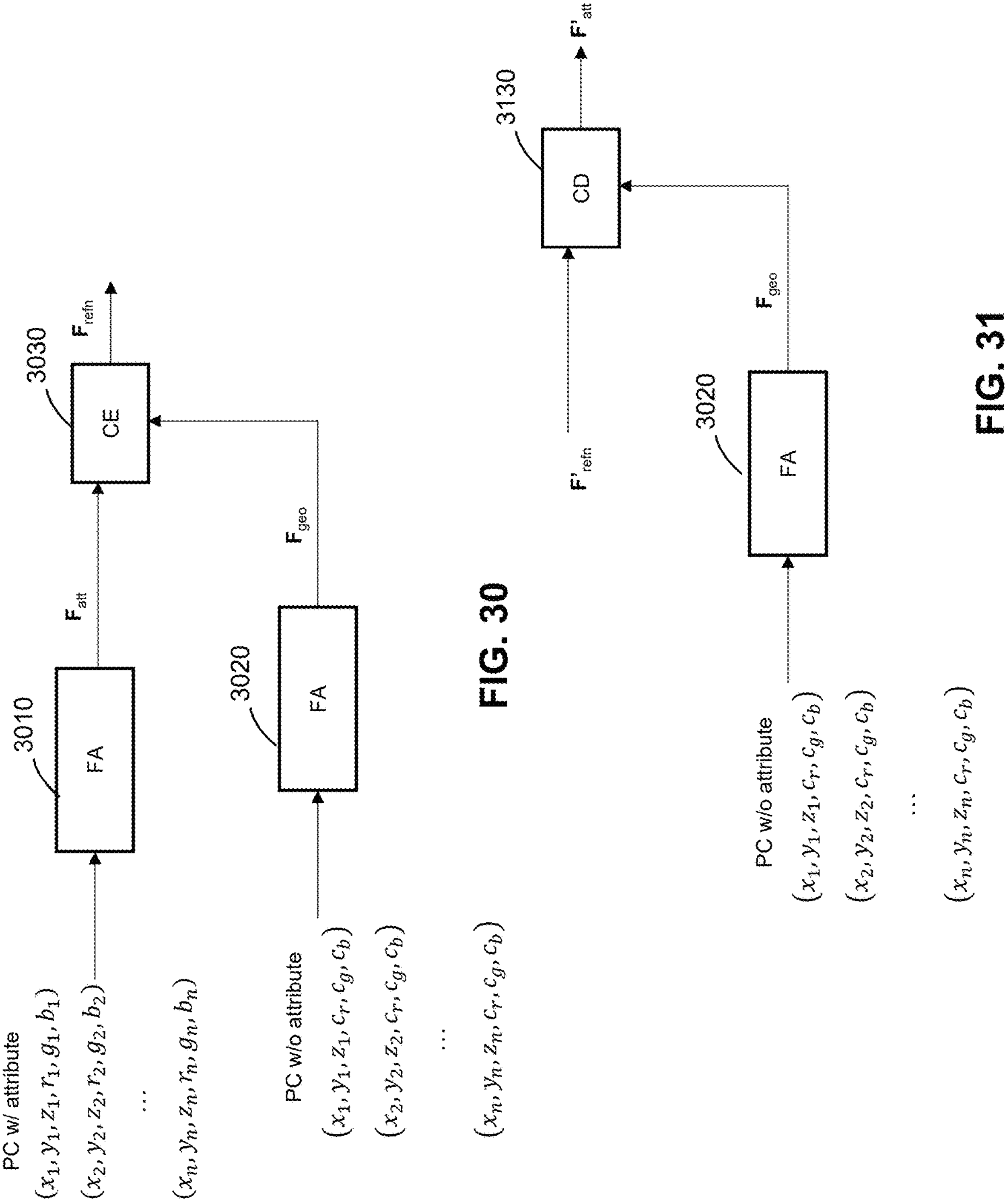
FIG. 30 illustrates attribute analysis for attribute encoding, according to an embodiment.
FIG. 31 illustrates attribute synthesis for attribute decoding, according to an embodiment.

Principles of the proposed method is described with FIG. 30 and FIG. 31. In a nutshell, we propose to compute the geometry feature in addition to the attribute feature and use the geometry feature to "remove" the redundant geometry information from the attribute feature.

Encoder side: The design on the encoder side is shown in FIG. 30. Compared to the original design, here we additionally compute the geometry feature $F_{geo}$ and use a conditional encoder (CE) module (3030) to process the feature map $F_{att}$, so as to remove the geometry information in $F_{att}$.

To compute the geometry feature, we first construct a point cloud without the known attribute (PC w/o attribute). To construct such a point cloud without known attributes, instead of putting the known attribute (e.g., RGB) on each voxel, one can put constants on the voxels. For example, all the values for the original R channel are replaced with a constant $c_r$, all the values for the original G channel are replaced with a constant $c_g$, and all the values for the original B channel are replaced with a constant $c_b$. The constants $c_r$, $c_g$, $c_b$ can be predefined values such as 128 if the color value ranges from 0 to 255. They can be 0.5 if the color value ranges from 0 to 1. The constants $c_r$, $c_g$, $c_b$ can also be an estimate of the average red, green, blue values of the input point cloud, respectively. The same rationale applies when other color space such as YUV color space is used. In an embodiment where the attribute is reflectance, we may replace the original reflectance values with a constant scalar such as 50 if the reflectance value ranges from 0 to 99.

In an embodiment where point-based feature aggregation is used, the point cloud without known attributes can be a point cloud consists of only the coordinates because we can configure the PointNet in FIG. 29 (top) to only take the (x, y, z) coordinates as inputs.

Next, the point cloud without attribute information is fed to another FA module (3020) to extract the geometry feature $F_{geo}$. The attribute feature map $F_{att}$ is obtained for example from a FA (3010) that takes as input the point cloud with attribute (PC w/attribute). The FA (3010) can be for example one of the FA described with FIG. 28 or FIG. 29 or a FA described with the intra or inter-coding frameworks described above.

The geometry feature $F_{geo}$ is fed to a conditional encoder (CE, 3030) module for further processing. The CE module (3030) takes both $F_{att}$ and $F_{geo}$ as inputs, where the geometry feature $F_{geo}$ can be viewed as a condition to refine/improve the attribute feature $F_{att}$. As stated earlier, an aim of the CE module (3030) is to decouple the geometry information in the attribute feature $F_{att}$ by utilizing the geometry feature $F_{geo}$. The output of the CE module (3030) is a refined attribute feature $F_{refn}$ which can be encoded and used for encoding attribute values of the points of the point cloud.

Decoder side: The design on the decoder is shown in FIG. 31 which reverses the process of conditional encoding (CE) on the encoder side. It is achieved with the conditional decoder module CD (3130). First, the geometry feature $F_{geo}$ is extracted (3020) in the same way that is done on the encoder side, so that the $F_{geo}$ in FIG. 31 is the same one as that in FIG. 30. Also note that on the decoder side, the reconstructed refined feature $F'_{refn}$ is received. Then the conditional decoder CD (3130) is used to update the reconstructed refined feature $F'_{refn}$. The conditional decoder CD (3130) takes as inputs both the features $F'_{refn}$ and $F_{geo}$. It processes $F'_{refn}$ using $F_{geo}$ as a condition, leading to the output reconstructed attribute feature $F'_{att}$. Note that $F'_{att}$ is associated with $F_{att}$ on the encoder side.

With the output reconstructed attribute feature $F'_{att}$, one may reconstruct the point cloud with attributes in the same way as described in the bottom part of FIG. 27. One may also use this reconstructed attribute feature $F'_{att}$, to assist lossless attribute coding as described above with FIG. 2-26.

The conditional encoder CE (3030) and conditional decoder CD (3130) follow exactly the same architecture illustrated on FIG. 17. The context/conditional input of the conditional encoder/decoder from FIG. 17 is in that case the geometry feature map $F_{geo}$. The input feature $F_{att}/F'_{refn}$ to CE/CD get concatenated with the context/conditional feature $F_{geo}$ followed by feature mixing via a few convolutional layers to output the updated feature $F_{refn}/F'_{att}$.

The methods provided with FIG. 30-31 can be implemented in the attribute compression framework described above in relation with FIG. 2, FIG. 3 and FIG. 9. In these designs, the CE (3030) can be used between the FA (310) and the FE (320) and the CD (3130) can be used after the FD (910) to reconstruct the attribute feature map.

Figure 32:
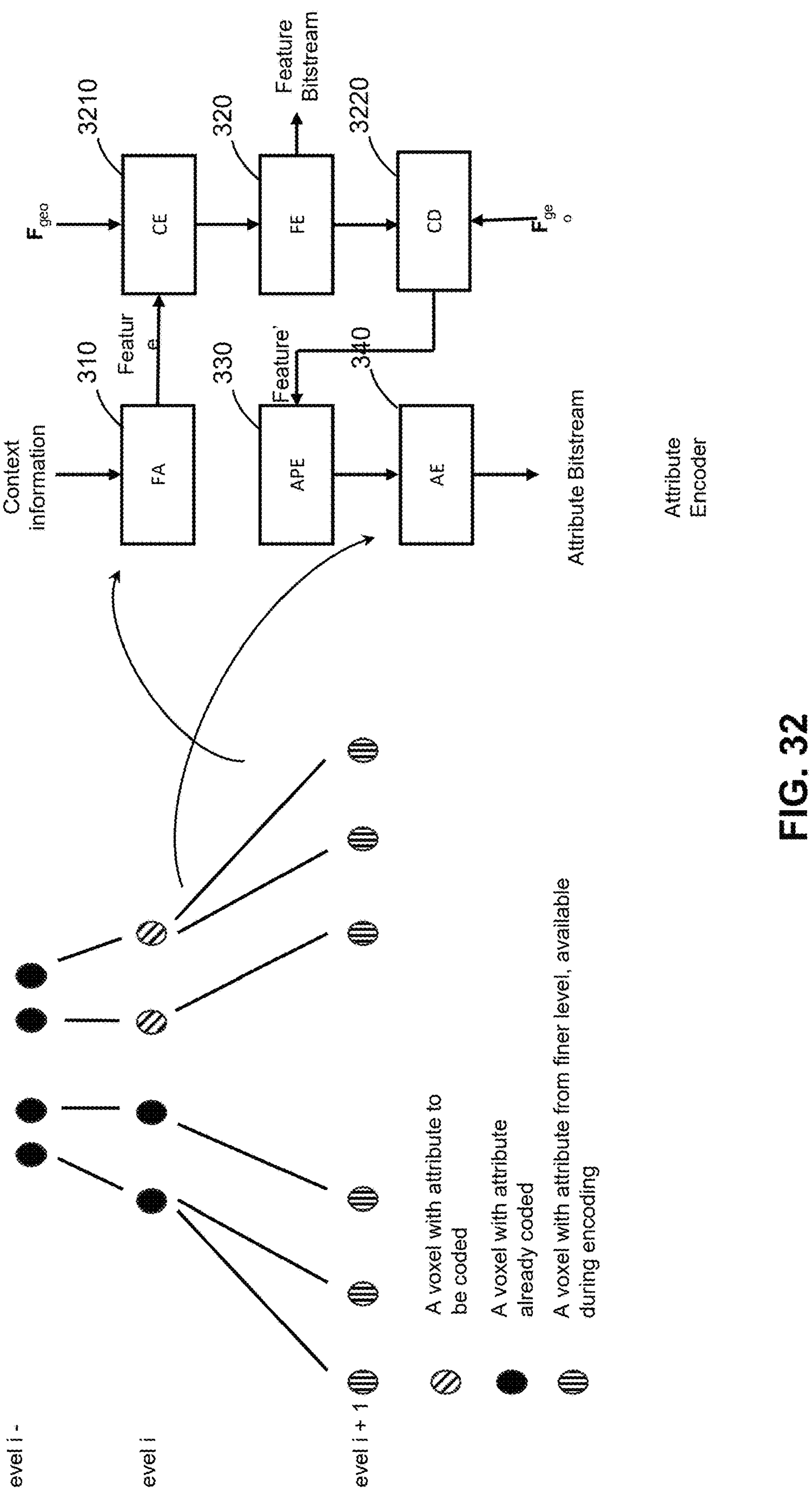
FIG. 32 illustrates an attribute encoding with known geometry for intra-coding, according to an embodiment.
Figure 33:
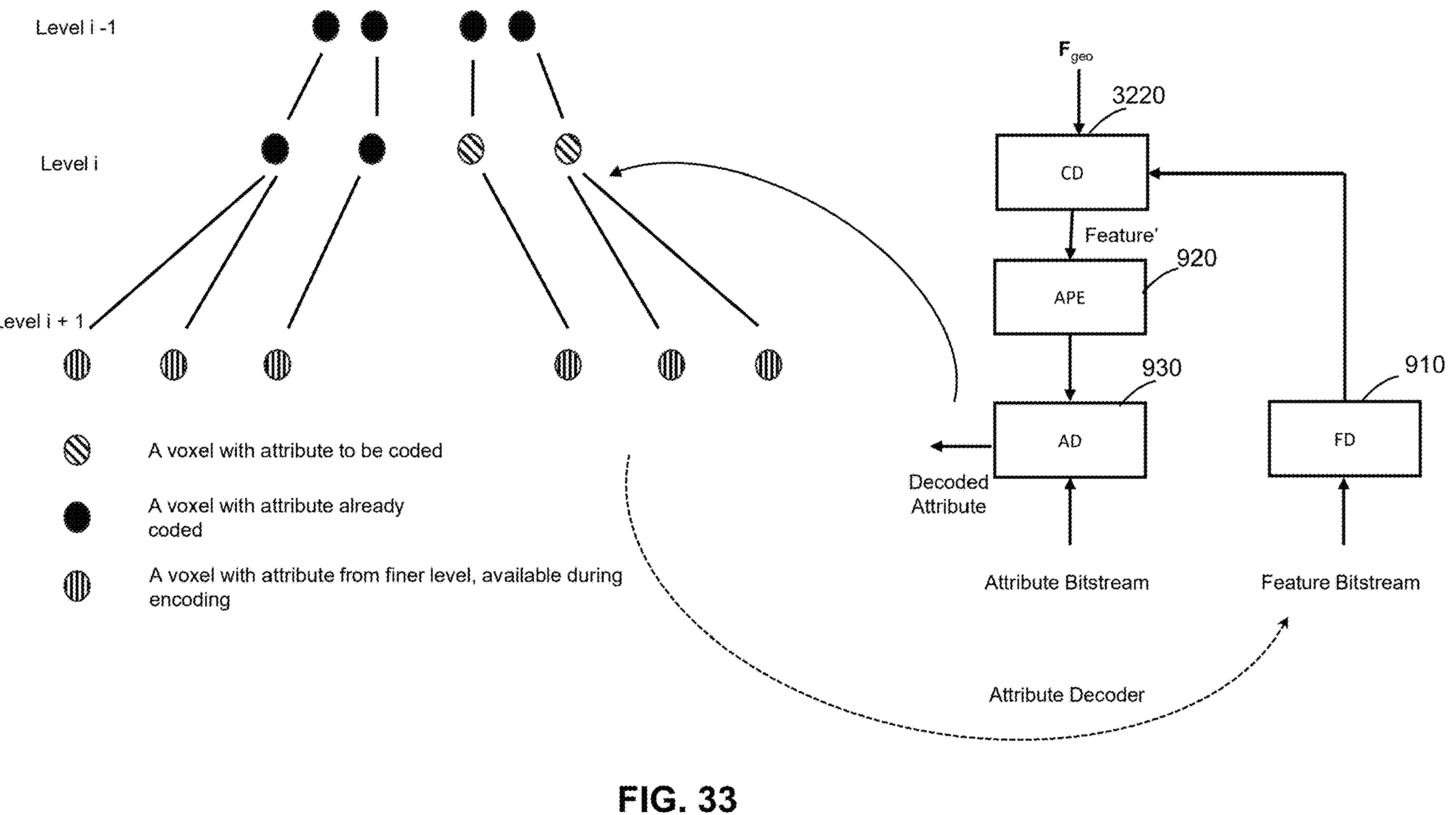
FIG. 33 illustrates an attribute decoding with known geometry for intra-coding, according to an embodiment.

FIGS. 32 and 33 illustrate the principles described in relation with FIG. 30-31 when implemented in the design described with FIG. 2, FIG. 3 and FIG. 9.

To apply the attribute coding with geometry decoupling described with FIG. 30-31 to the design of FIGS. 2, 3 and 9, one needs to extract the geometry feature and apply the conditional encoder/decoder to process the input feature based on the extracted geometry feature.

Encoder side: FIG. 32 shows such an implementation on the encoder side. We note that the feature extracted with FA (310) is now fed to the conditional encoder module CE (3210), then the conditional encoder CE (3210) processes this input feature based on the geometry feature $F_{geo}$. The feature output by the conditional encoder CE (3210) is encoded by the feature encoder FE (320) leading to a feature bitstream. The reconstructed feature by FE (3210) is then fed to the conditional decoder CD (3220). The conditional decoder CD (3220) processes the reconstructed feature of FE with the geometry feature $F_{geo}$, leading to the processed feature (Feature'). Feature' is then used by the APE module (330) for probability estimation, so as to assist the arithmetic coding (340) of the attribute. All the other steps and details remain the same as presented with FIGS. 2 and 3.

Decoder side: FIG. 33 shows the implementation on the decoder side. We note that the feature decoded by FD (910) is now fed to the conditional decoder module CD (3220), then the conditional decoder CD (3220) processes this decoded feature based on the geometry feature $F_{geo}$, leading to the output feature (Feature' in FIG. 33). It is the same as the Feature' in FIG. 32. This Feature' is then used to perform probability estimation (920), so as to assist the arithmetic decoding (930) of the attribute. All the other steps and details remain the same as presented with FIGS. 2 and 9.

These implementations can be integrated in the full compression framework for intra coding illustrated on FIG. 14 wherein for the octree-based coding part, the CE module (3210) can be inserted in-between the feature extraction modules (1420, 1421, 1422) and the feature encoder FE modules (1430, 1431 1432), the CD module (3220) can be inserted in-between the feature encoder FE modules (1430, 1431 1432) and the attribute coding modules (1440, 1441, 1442) and in-between the feature decoder FD modules (1450, 1451 1452) and the attribute coding modules (1460, 1461, 1462) and for the feature-based coding, the CE module (3210) can be inserted in-between the feature extraction module (1472) and the feature encoder FE (1433) and the CD module (3220) can be inserted in-between the feature decode FD module (1453) and the first reconstruction module (1475).

In a similar manner, the methods provided with FIG. 30-31 can be implemented in the attribute compression framework described above in relation with FIG. 18 and FIG. 19 in the case of inter-coding. In these designs, the CE (1810 and CD (1820) are modified to take as additional conditional input the geometry feature map.

Figure 34:
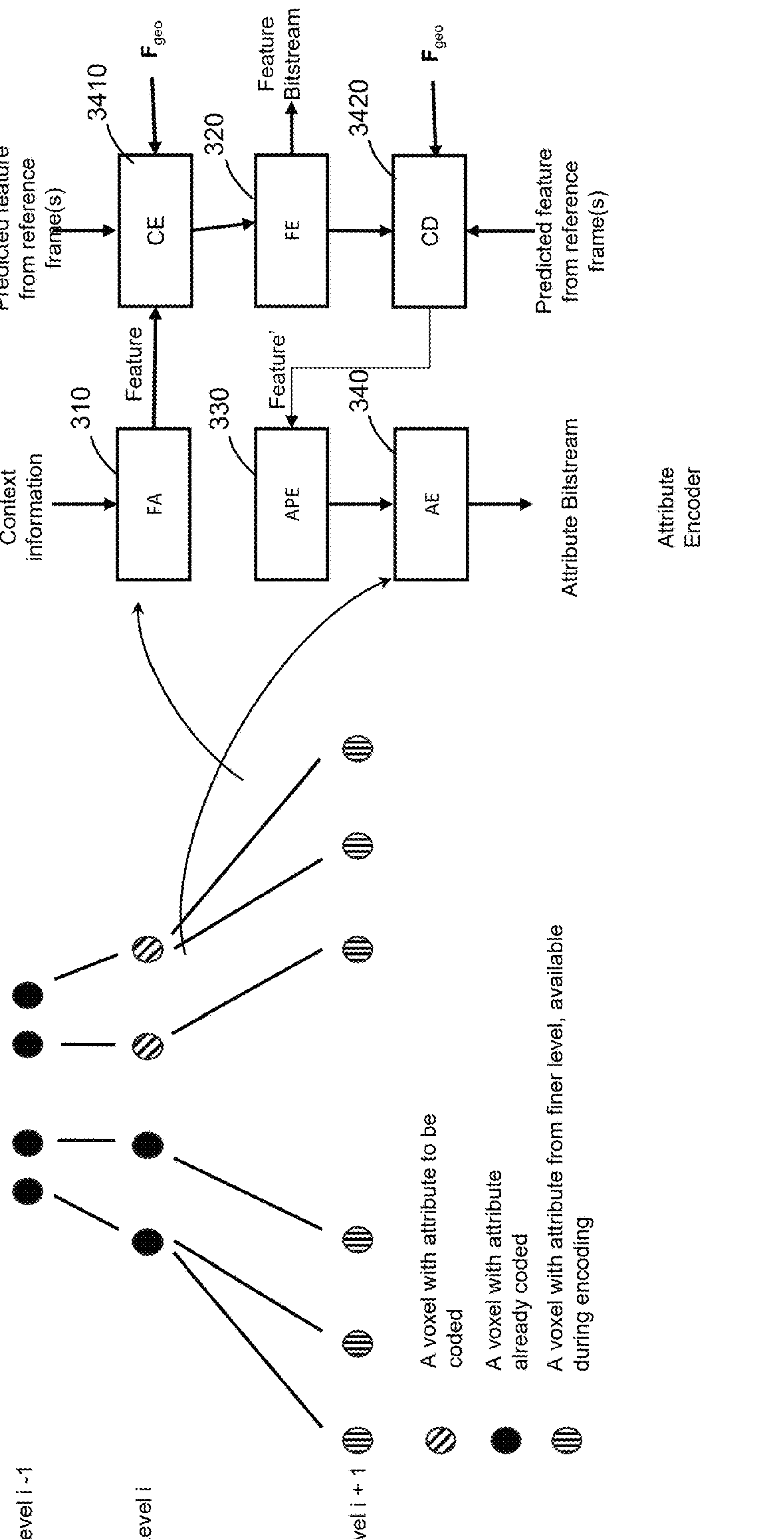
FIG. 34 illustrates an attribute encoding with known geometry for inter-coding, according to an embodiment.
Figure 35:
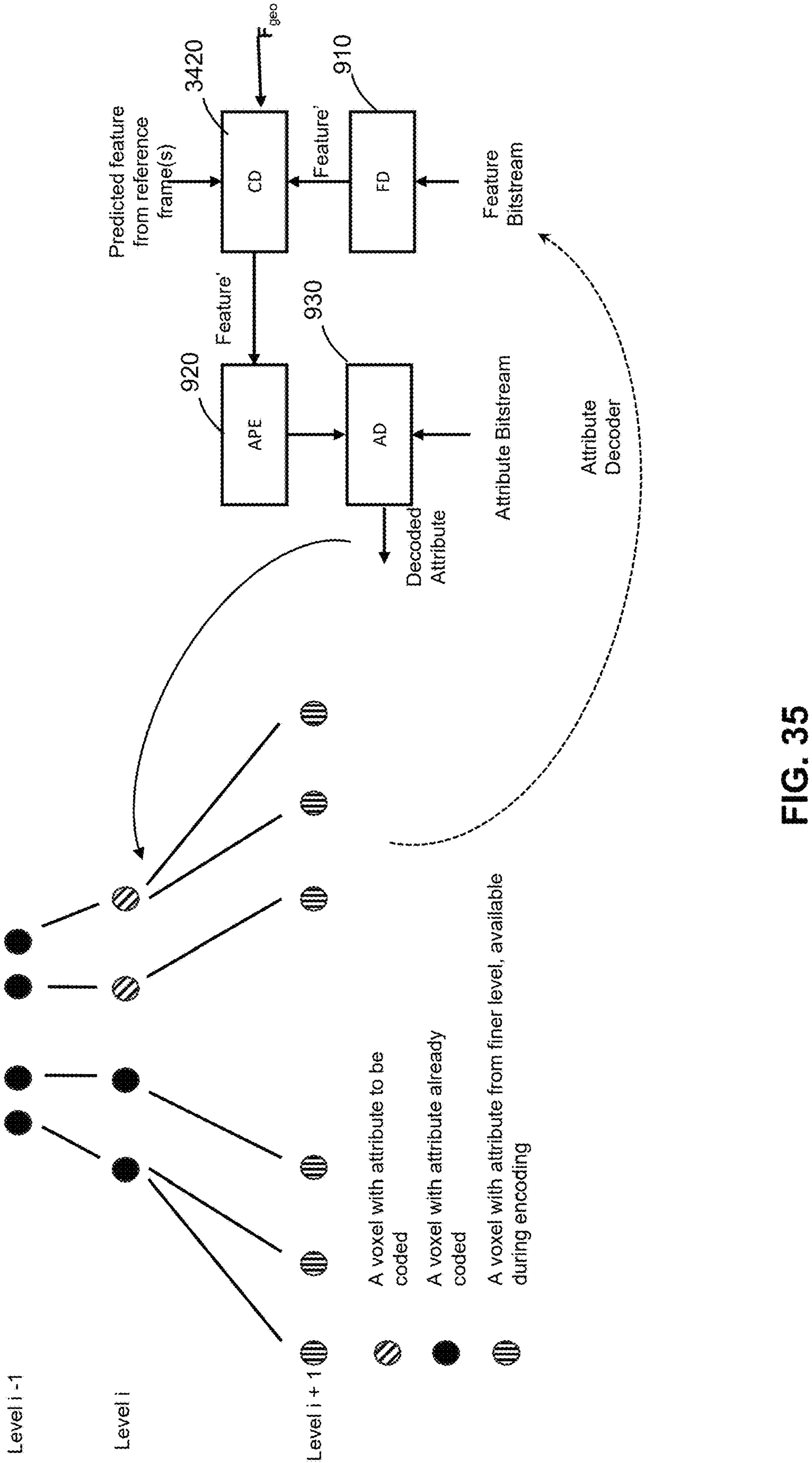
FIG. 35 illustrates an attribute decoding with known geometry for inter-coding, according to an embodiment.

FIGS. 34 and 35 illustrate the principles described in relation with FIG. 30-31 when implemented in the design described with FIG. 18 and FIG. 19.

To apply the attribute coding with geometry decoupling described with FIG. 30-31 to the design of FIG. 18 and FIG. 19, one needs to extract the geometry feature and apply the conditional encoder/decoder to process the input feature and the predicted feature based on the extracted geometry feature.

Encoder side: FIG. 34 shows such an implementation on the encoder side. The attribute feature extracted with FA (310) is fed to the conditional encoder module CE (3410), then the conditional encoder CE (3410) processes this input feature based on the geometry feature $F_{geo}$ and the predicted feature. The feature output by the conditional encoder CE (3410) is encoded by the feature encoder FE (320) leading to a feature bitstream. The reconstructed feature by FE (320) is then fed to the conditional decoder CD (3420). The conditional decoder CD (3420) processes the reconstructed feature of FE with the geometry feature $F_{geo}$ and the predicted feature obtained from the reference frame leading to the processed feature (Feature'). Feature' is then used by the APE module (330) for probability estimation, so as to assist the arithmetic coding (340) of the attribute. All the other steps and details remain the same as presented with FIG. 18.

Decoder side: FIG. 35 shows the implementation on the decoder side. The feature decoded by FD (910) is fed to the conditional decoder module CD (3420), then the conditional decoder CD (3420) processes this decoded feature based on the geometry feature $F_{geo}$ and the predicted feature obtained from the reference frame, leading to the output feature (Feature' in FIG. 35). It is the same as the Feature' in FIG. 34. This Feature' is then used to perform probability estimation (920), so as to assist the arithmetic decoding (930) of the attribute. All the other steps and details remain the same as presented with FIG. 19.

The structure of the conditional encoder CE (3410) and the conditional decoder CD (3420) is similar to the one described with FIG. 17 except that the concatenation layer operates on the three inputs: the extracted attribute feature of the current point cloud frame, and as conditional input the predicted feature obtained from the reference frame and the geometry feature extracted for the current point cloud frame. Particularly, instead of concatenating two features as shown in FIG. 17, in this embodiment, the concatenation layer simply concatenates the three input features together and form a concatenated feature. The concatenated feature is then fed to the subsequent convolutional layer. Note that this concatenated feature has more channels due to the additional input geometry feature. Therefore, the input channel size of the convolutional layer should also be increased. For example, take the first convolutional layer (1720) in FIG. 17 as an example, without the introduced geometry feature, it has an input channel size of 64. Then with the newly introduced geometry feature as an additional condition (suppose the geometry feature has 32 channels), the input channel size of the first convolutional layer should become 64+32=96 while its output channel size remains the same. The rest of the details of the CE/CD also remains the same as illustrated in FIG. 17.

These above-described implementations can be integrated in the full compression framework for inter coding illustrated on FIG. 25 wherein for the octree-based coding part, the conditional encoder (CE) of the conditional feature encoder modules CFE and the conditional decoder (CD) of the conditional feature decoder modules CFD take as additional input the geometry feature map.

Parameter Sharing

In this embodiment, it is proposed to let all the feature aggregators FA modules in FIG. 30 and FIG. 31 share the same architecture design, as well as sharing the same neural network parameters.

In this way, the geometry feature $F_{geo}$ and the attribute feature $F_{att}$ are in the same feature space. In other words, the values in $F_{geo}$ and $F_{att}$ becomes directly comparable, and they can be more effectively processed by the conditional encoder CE and the conditional decoder CD.

Advanced Architectures and General Tree-Based Coding

The CNN modules presented in the designs described in this document are just for example. Advanced neural network architectures can be applied without changing the intended technologies. Additionally, the proposed method applies to other tree-based coding other than octree coding alone.

Training Strategy

The training of the proposed compression framework is briefly described below. It follows a stochastic training strategy. For the training dataset, no special pre-processing is required and the training directly operates on the raw point clouds with attributes.

Training of Octree Coding Network

We hereby discuss the training of the octree coding network of FIG. 25 or FIG. 14. In one training iteration, rather than performing loss computation and backpropagation for the whole network, we randomly pick an octree level and only focus on the training of that particular octree level—this strategy can greatly reduce the memory consumption during training. That is because the design eliminates the dependency between different levels which in turn can reduce the memory consumption during training.

To perform the training at one octree level, let's say, our work first computes the rate of the feature F (denoted by R) estimated by the hyperprior model. We also compute the cross entropy (or distortion) loss between the APE probability estimation output and the ground-truth attribute value, denoted by D. The overall loss is given by $L_{lossless}=D+\lambda\cdot R$, where $\lambda$ is the R−D trade off parameter.

Training of Feature Coding Network

We hereby discuss the training of our lossy coding network of FIG. 25 or FIG. 14. Similar to the training strategy of octree coding, we also randomly pick an octree level and only focus on the training of that particular level. To perform the training at one octree level, our work first computes the rate of the feature F (denoted by R) estimated by the hyperprior model. We also compute the MSE loss between the predicted attribute value and the ground-truth attribute value, denoted by D. The overall loss is given by $L_{lossy}=D+\lambda R$, where $\lambda$ is the R−D trade off parameter.

In addition to one-level training, it is also beneficial to train more than one-level in one iteration such as two-level training. In this case, we randomly pick two consecutive octree levels, let say, level k and k−1, then we compute the rates incurred by them (denoted by $R_k$ and $R_{k-1}$, respectively), as well as the distortions incurred by them (denoted by $D_k$ and $D_{k-1}$, respectively). Then the overall loss is given by $L_{lossy}=(D_k+D_{k-1})+\lambda\cdot(R_k+R_{k-1})$. Training more than one consecutive octree levels enables the network model to learn to balance the rate allocation between different levels and leads to better overall R−D performance.

Others

To train a model that is sharing neural network parameters for both the case of octree coding and feature-based coding, in one training iteration, we randomly configure the network to either the case of octree coding, or feature-based coding. For instance, with a probability of 0.6, the network would be configured as an octree coder to perform a training iteration. And with a probability of 0.4, the network would be configured as a feature-based coder to perform a training iteration.

To train a model that share neural network parameters for both the case of inter coding and intra coding, in one training iteration, we randomly configure the network to either work in the inter mode (with the inter/intra flag being 1) or in the intra mode (with the inter/intra flag being 0). For instance, with a probability of 0.8, the network would be configured to work in the inter mode for a training iteration. And with a probability of 0.2, the network would be configured in the intra mode for training.

To train a model that can support rate control, the R-D tradeoff parameter, in the training loss and the λ fed to the style control (from previous work described in '987 application and '402 application) should be the same number. The style control allows to the framework to achieve finer-grain rate control at inference.

Additionally, to enable a more stable training, the training is divided into two stages. At the first stage, we always pick a very small λ (e.g., $\lambda<10^{-6}$) for training. The first stage lasts for a few epochs such as 10 epochs. The first stage training is to provide a warm start for the neural network, letting it to only focus on learning good reconstructions.

In the second stage, we randomly pick a different X for each training iteration where the λ is picked from a pre-defined range that is desired for the network to operate at, e.g., $\lambda\in[0.001, 2]$. The second stage training starts after the first stage training and continues until the end. The second stage training is to enable the network to adapt itself to different requirements of λ—learning to achieve different R-D tradeoffs.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding point cloud data according to the methods described above.

One or more embodiments provide a computer readable storage medium having stored thereon point cloud data generated according to the methods described above. One or more embodiments also provide a method and apparatus for transmitting or receiving point cloud data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an order to the operations unless specifically required.

The present disclosure may refer to "determining" various pieces of information. Determining information may include one or more of, for example, estimating, calculating, predicting, or retrieving (e.g., from memory) the information.

The present disclosure may refer to "accessing" various pieces of information. Accessing information may include one or more of, for example, receiving, retrieving (e.g., from memory), storing, moving, copying, calculating, determining, predicting, or estimating the information.

Similarly, the present disclosure may refer to "receiving" various pieces of information. Receiving information may include one or more of, for example, accessing or retrieving (e.g., from memory) the information.

It is to be understood that use of any of the following "/", "and/or", and "at least one of" is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

The invention claimed is:

1. A method for reconstructing attributes of a point cloud, the method comprising:

obtaining a geometry feature map representative of a geometry of the point cloud;

decoding an attribute feature map from a bitstream, providing a decoded attribute feature map, the attribute feature map being representative of attributes of points of the point cloud;

updating the decoded attribute feature map with the geometry feature map by providing the geometry feature map and the decoded attribute map to a neural network-based conditional feature decoder, wherein the neural network-based conditional feature decoder comprises:

a concatenation layer that concatenates the decoded attribute feature map with the geometry feature map providing a concatenated feature map, and one or more convolutional layers that mix features of the concatenated feature map to output an updated decoded attribute feature map; and reconstructing attributes of points of the point cloud based on the updated decoded attribute feature map.

2. The method of claim 1, wherein the point cloud is represented with an octree structure, and wherein the attribute feature map represents voxel attributes at a current level in the octree structure of the point cloud.

3. The method of claim 2, wherein a feature in the attribute feature map for a current voxel is representative of at least a set of voxels that are still to be reconstructed.

4. The method of claim 2, wherein reconstructing attributes of points reconstructs voxel attributes at the current level in the octree structure and comprises:

determining an attribute probability of a current voxel based on the updated decoded attribute feature map, and decoding attribute information for the current voxel based on the attribute probability determined for the current voxel.

5. The method of claim 2, wherein reconstructing attributes of points reconstructs voxel attributes at the current level in the octree structure and comprises:

obtaining an attribute prediction for a current voxel from reconstructed voxel attributes at a previous level of the octree structure, and reconstructing an attribute value for the current voxel based on the attribute prediction obtained for the current voxel and the updated decoded attribute feature map.

6. The method of claim 1, wherein the decoded attribute feature map is updated with the geometry feature map and a predicted feature map obtained from a reference point cloud frame.

7. The method of claim 1, wherein the geometry feature map is obtained as an output of a feature aggregator neural network that processes a decoded point cloud without attributes.

8. An apparatus comprising one or more processors, coupled to a memory, the apparatus being configured to:

obtain a geometry feature map representative of a geometry of a point cloud;

decode an attribute feature map from a bitstream, providing a decoded attribute feature map, the attribute feature map being representative of attributes of points of the point cloud;

update the decoded attribute feature map with the geometry feature map by providing the geometry feature map and the decoded attribute map to a neural network-based conditional feature decoder, wherein the neural network-based conditional feature decoder comprises:

a concatenation layer that concatenates the decoded attribute feature map with the geometry feature map providing a concatenated feature map, and one or more convolutional layers that mix features of the concatenated feature map to output an updated decoded attribute feature map; and reconstruct attributes of points of the point cloud based on the updated decoded attribute feature map.

9. The apparatus of claim 8, wherein the geometry feature map is obtained as an output of a feature aggregator neural network that processes a decoded point cloud without attributes.

10. The apparatus of claim 8, wherein the point cloud is represented with an octree structure, and wherein the attribute feature map represents voxel attributes at a current level in the octree structure of the point cloud.

11. The apparatus of claim 10, wherein a feature in the attribute feature map for a current voxel is representative of at least a set of voxels that are still to be reconstructed.

12. The apparatus of claim 10, wherein reconstructing attributes of points reconstructs voxel attributes at the current level in the octree structure and comprises:

determining an attribute probability of a current voxel based on the updated decoded attribute feature map, and decoding attribute information for the current voxel based on the attribute probability determined for the current voxel.

13. The apparatus of claim 8, wherein the decoded attribute feature map is updated with the geometry feature map and a predicted feature map obtained from a reference point cloud frame.

14. A method for encoding attributes of a current point cloud, the method comprising:

obtaining a geometry feature map representative of a geometry of the point cloud;

obtaining an attribute feature map, the attribute feature map being representative of attributes of points of the point cloud;

refining the attribute feature map with the geometry feature map by providing the geometry feature map and the attribute feature map to a neural network-based conditional feature encoder, providing a refined attribute feature map;

encoding the refined attribute feature map;

obtaining an updated attribute feature map from a decoded version of the refined attribute feature map and the geometry feature map by providing the geometry feature map and the decoded version of the refined attribute feature map to a neural network-based conditional feature decoder, wherein the neural network-based conditional feature decoder comprises:

a concatenation layer that concatenates the decoded version of the refined attribute feature map with the geometry feature map providing a concatenated feature map, and one or more convolutional layers that mix features of the concatenated feature map to output the updated decoded attribute feature map; and encoding attributes of points of the point cloud based on the updated attribute feature map.

15. The method of claim 14, wherein the point cloud is represented with an octree structure, and wherein the attribute feature map represents voxel attributes at a current level in the octree structure of the point cloud.

16. The method of claim 15, wherein a feature in the attribute feature map for a current voxel is representative of at least a set of voxels that are still to be reconstructed.

17. The method of claim 15, wherein encoding attributes of points of the point cloud encodes voxel attributes at the current level in the octree structure and comprises:

determining an attribute probability of a current voxel based on the updated attribute feature map, and encoding attribute information for the current voxel based on the attribute probability determined for the current voxel.

18. An apparatus comprising one or more processors, coupled to a memory, the apparatus being configured to:

obtain a geometry feature map representative of a geometry of a point cloud;

obtain an attribute feature map, the attribute feature map being representative of attributes of points of the point cloud;

refine the attribute feature map with the geometry feature map by providing the geometry feature map and the attribute feature map to a neural network-based conditional feature encoder, providing a refined attribute feature map;

encode the refined attribute feature map;

obtain an updated attribute feature map from a decoded version of the refined attribute feature map and the geometry feature map by providing the geometry feature map and the decoded version of the refined attribute feature map to a neural network-based conditional feature decoder, wherein the neural network-based conditional feature decoder comprises:

a concatenation layer that concatenates the decoded version of the refined attribute feature map with the geometry feature map providing a concatenated feature map, and one or more convolutional layers that mix features of the concatenated feature map to output the updated decoded attribute feature map; and encode attributes of points of the point cloud based on the updated attribute feature map.

19. The apparatus of claim 18, wherein the point cloud is represented with an octree structure, and wherein the attribute feature map represents voxel attributes at a current level in the octree structure of the point cloud.

20. The apparatus of claim 18, wherein the geometry feature map is obtained as an output of a feature aggregator neural network that processes a decoded point cloud without attributes.

* * * * *